United States Patent
Park et al.

(10) Patent No.: US 10,469,141 B2
(45) Date of Patent: Nov. 5, 2019

(54) METHOD AND DEVICE FOR TRANSMITTING FEEDBACK FRAME IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/384,751

(22) Filed: Apr. 15, 2019

(65) Prior Publication Data
US 2019/0245594 A1   Aug. 8, 2019

Related U.S. Application Data

(63) Continuation of application No. 15/773,144, filed as application No. PCT/KR2016/013701 on Nov. 25, 2016, now Pat. No. 10,305,552.

(60) Provisional application No. 62/259,644, filed on Nov. 25, 2015.

(51) Int. Cl.
*H04B 7/0452* (2017.01)
*H04L 27/26* (2006.01)
*H04W 72/04* (2009.01)
*H04W 84/12* (2009.01)
(Continued)

(52) U.S. Cl.
CPC ......... *H04B 7/0452* (2013.01); *H04L 5/0048* (2013.01); *H04L 25/02* (2013.01); *H04L 27/26* (2013.01); *H04L 27/2613* (2013.01); *H04W 72/0453* (2013.01); *H04W 84/12* (2013.01)

(58) Field of Classification Search
CPC combination set(s) only.
See application file for complete search history.

(56) References Cited

U.S. PATENT DOCUMENTS

| | | |
|---|---|---|
| 9,304,186 B2 | 4/2016 | Amizur et al. |
| 9,391,742 B2 | 7/2016 | Srinivasa et al. |
| 9,391,811 B2 | 7/2016 | Srinivasa et al. |

(Continued)

FOREIGN PATENT DOCUMENTS

| | | |
|---|---|---|
| WO | 2014029368 | 2/2014 |
| WO | 2016161433 | 10/2016 |

OTHER PUBLICATIONS

PCT International Application No. PCT/KR2016/013701, Written Opinion of the International Searching Authority dated Feb. 17, 2017, 68 pages.

(Continued)

*Primary Examiner* — Linda Wong
(74) *Attorney, Agent, or Firm* — Lee, Hong, Degerman, Kang & Waimey PC

(57) ABSTRACT

Provided are a method and a device for transmitting a feedback frame in a wireless LAN system. Particularly, a first wireless station receives, from a second wireless station, a feedback request field including an LTF. The first wireless station configures feedback information on a wireless channel corresponding to a preset frequency band by using the feedback request field. The first wireless station transmits the feedback information to the second wireless station.

11 Claims, 17 Drawing Sheets

(51) Int. Cl.
*H04L 5/00* (2006.01)
*H04L 25/02* (2006.01)

(56) References Cited

U.S. PATENT DOCUMENTS

| | | | |
|---|---|---|---|
| 9,544,095 B2 | 1/2017 | Kim et al. | |
| 9,736,277 B2* | 8/2017 | Lee | H04L 69/22 |
| 10,123,331 B2* | 11/2018 | Park | H04W 72/0453 |
| 10,129,060 B2 | 11/2018 | Jones, IV et al. | |
| 10,158,511 B2* | 12/2018 | Yang | H04L 27/2602 |
| 10,305,552 B2* | 5/2019 | Park | H04L 25/02 |
| 2006/0056540 A1 | 3/2006 | Magee | |
| 2007/0298742 A1* | 12/2007 | Ketchum | H04B 7/0617 |
| | | | 455/186.1 |
| 2008/0002794 A1 | 1/2008 | Wallace et al. | |
| 2008/0056305 A1 | 3/2008 | Medvedev et al. | |
| 2009/0141681 A1 | 6/2009 | Hwang et al. | |
| 2009/0262696 A1 | 10/2009 | Wei et al. | |
| 2010/0203885 A1 | 8/2010 | Chen et al. | |
| 2011/0149884 A1 | 6/2011 | Choi et al. | |
| 2011/0255620 A1 | 10/2011 | Jones, IV et al. | |
| 2011/0305296 A1 | 12/2011 | Van Nee | |
| 2012/0039406 A1 | 2/2012 | Srinivasa et al. | |
| 2012/0127899 A1* | 5/2012 | Ketchum | H04B 7/0617 |
| | | | 370/310 |
| 2012/0128109 A1 | 5/2012 | Wallace et al. | |
| 2012/0230448 A1 | 9/2012 | Kang et al. | |
| 2013/0202001 A1 | 8/2013 | Zhang | |
| 2014/0093005 A1 | 4/2014 | Xia et al. | |
| 2014/0198877 A1 | 7/2014 | Van Nee | |
| 2014/0219390 A1 | 8/2014 | Imamura et al. | |
| 2014/0321386 A1 | 10/2014 | Fu | |
| 2014/0334420 A1 | 11/2014 | You et al. | |
| 2014/0348097 A1 | 11/2014 | Park et al. | |
| 2015/0078494 A1 | 3/2015 | Talvitie et al. | |
| 2015/0124794 A1 | 5/2015 | Hansen et al. | |
| 2015/0195112 A1 | 7/2015 | Jones, IV et al. | |
| 2015/0271701 A1 | 9/2015 | Baik et al. | |
| 2015/0349995 A1* | 12/2015 | Zhang | H04L 5/0048 |
| | | | 375/295 |
| 2015/0365923 A1* | 12/2015 | Vermani | H04W 72/042 |
| | | | 370/329 |
| 2016/0013965 A1 | 1/2016 | Srinivasa et al. | |
| 2016/0044648 A1 | 2/2016 | Gao et al. | |
| 2016/0073379 A1* | 3/2016 | Yang | H04W 28/20 |
| | | | 370/329 |
| 2016/0094895 A1 | 3/2016 | Stadelmeier et al. | |
| 2016/0165482 A1* | 6/2016 | Yang | H04L 5/00 |
| | | | 370/336 |
| 2017/0171860 A1* | 6/2017 | Park | H04W 72/0453 |
| 2017/0272295 A1* | 9/2017 | Lee | H04L 5/00 |
| 2017/0338927 A1* | 11/2017 | Park | H04L 27/26 |
| 2017/0338928 A1* | 11/2017 | Park | H04L 27/26 |
| 2018/0323837 A1* | 11/2018 | Park | H04L 25/02 |
| 2019/0132034 A1* | 5/2019 | Yun | H04B 7/0617 |

OTHER PUBLICATIONS

U.S. Appl. No. 15/773,144, Notice of Allowance dated Jan. 14, 2019, 16 pages.
European Patent Office Application Serial No. 16868930.5, Search Report dated Aug. 6, 2019, 15 pages.
Stacey, "Specification Framework for TGax", IEEE 802.11-15/0132r8, Sep. 22, 2015, 22 pages.

* cited by examiner

FIG. 1
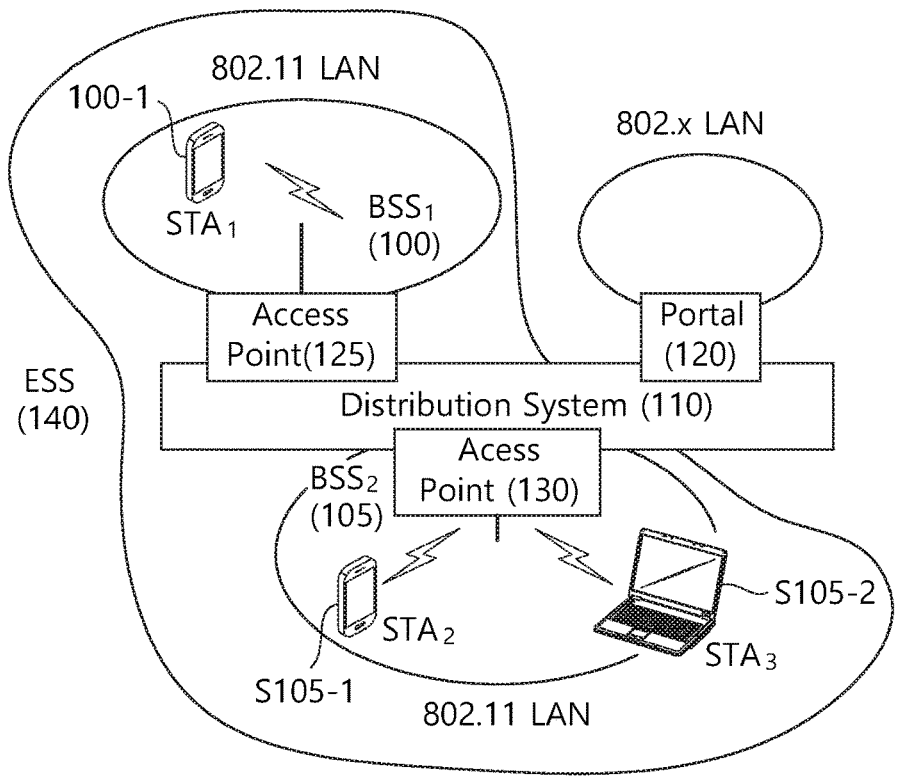
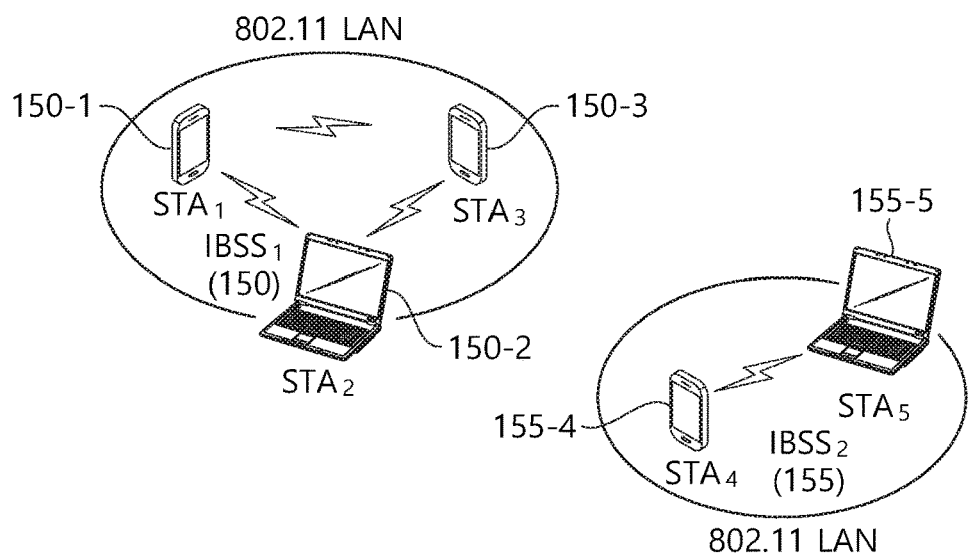

FIG. 3

| L-LTF | L-STF | L-SIG | RL-SIG | HE-SIG A | HE-SIG B | HE-STF | HE-LTF | ... | HE-LTF | Data | PE |

8μs | 8μs | 4μs | 4μs | 8μs | 4μs per symbol | 4μs | Variable durations per HE-LTF symbol

METHOD AND DEVICE FOR TRANSMITTING FEEDBACK FRAME IN WIRELESS LAN SYSTEM

CROSS-REFERENCE TO RELATED APPLICATIONS

This application is a continuation of U.S. patent application Ser. No. 15/773,144, filed on May 2, 2018, now U.S. Pat. No. 10,305,552, which is the National Stage filing under 35 U.S.C. 371 of International Application No. PCT/KR2016/013701, filed on Nov. 25, 2016, which claims the benefit of U.S. Provisional Application No. 62/259,644, filed on Nov. 25, 2015, the contents of which are all hereby incorporated by reference herein in their entirety.

TECHNICAL FIELD

The present invention relates to wireless communications, and more particularly, to a method of transmitting a feedback frame in a wireless local area network (WLAN) system and an apparatus using the same.

BACKGROUND ART

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

Specifically, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

DISCLOSURE

Technical Problem

An object of this specification is to provide a method of transmitting a feedback frame in a WLAN system and a device using the same.

Technical Solution

This specification proposes a method of transmitting a feedback frame based on a sounding procedure in a WLAN system.

Furthermore, there is proposed a method performed by a first wireless station of a WLAN system supporting a plurality of frequency resource units corresponding to different frequencies.

First, terms are summarized. The first wireless station may correspond to a beamformee or an STA, and a second wireless station may correspond to a beamformer or an AP. The different frequencies may correspond to 20 MHz, 40 MHz, 80 MHz, etc. The plurality of frequency resource units corresponding to the different frequencies may correspond to a 26-RU, a 52-RU, a 106-RU, a 242-RU, a 484-RU and/or a 996-RU.

The first wireless station receives a feedback request field, including a long training field (LTF), from the second wireless station. The feedback request field including the LTF may correspond to a null data packet (NDP).

The first wireless station configures feedback information regarding a radio channel corresponding to a predetermined frequency band using the feedback request field.

The first wireless station transmits the feedback information to the second wireless station.

The feedback information includes channel status information about a predetermined subcarrier index. The predetermined subcarrier index may correspond to the feedback subcarrier index. Furthermore, the predetermined subcarrier index is determined depending on a predetermined subcarrier grouping number. That is, the channel status information indicates a feedback subcarrier for each subcarrier group. In other words, the channel status information indicates that a feedback subcarrier is allocated where within a frequency band.

The subcarrier group is generated from subcarriers except a guard subcarrier and DC carrier within a frequency band based on grouping information. That is, the predetermined subcarrier index may be determined depending on the predetermined subcarrier grouping number other than a guard subcarrier and a DC subcarrier.

As a detailed example, if the predetermined frequency band is 20 MHz and the predetermined subcarrier grouping number is set to 4, the predetermined subcarrier indices are set to [−122, −120:4:−4, −2, 2, 4:4:120, 122]. Here, the notation x:y:z corresponds to a range beginning at x and ending at z having a step size of y, i.e., the range indicated above corresponds to [(−122), −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, (−2), (2), 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, (122)]. The tone index (a) indicated by parentheses indicates that the index a is additionally used.

Furthermore, if the predetermined frequency band is 20 MHz and the predetermined subcarrier grouping number is set to 16, the predetermined subcarrier indices are set to [−122, −116:16:−4, −2, 2, 4:16:116, 122]. Here, the notation x:y:z corresponds to a range beginning at x and ending at z having a step size of y, i.e., the range indicated above corresponds to [(−122), −116, −100, −84, −68, −52, −36, −20, −4, (−2), (2), 4, 20, 36, 52, 68, 84, 100, 116, (122)]. The tone index (a) indicated by parentheses indicates that the index a is additionally used.

In this case, if the predetermined frequency band is 20 MHz and the predetermined subcarrier grouping number is set to 4 or 16, [−122, −2, 2, 122] of the predetermined subcarrier indices may be used to perform interpolation for channel estimation.

Furthermore, if the predetermined frequency band is 40 MHz and the predetermined subcarrier grouping number is set as Ng, the predetermined subcarrier indices are set to [−244:Ng:−4, 4:Ng:244]. Here, the notation x:y:z corresponds to a range beginning at x and ending at z having a step size of y, i.e., if the predetermined subcarrier grouping number is set to 4, the range indicated above corresponds to [−244, −240, −236, −232, −228, −224, −220, −216, −212, −208, −204, −200, −196, −192, −188, −184, −180, −176, −172, −168, −164, −160, −156, −152, −148, −144, −140, −136, −132, −128, −124, −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 192, 196, 200, 204, 208, 212, 216, 220, 224, 228, 232, 236, 240, 244]. If the predetermined subcarrier grouping number is set to 16, the range indicated above corresponds to [−244, −228, −196, −180, −164, −148, −132, −116, −100, −84, −68, −52, −36, −20, −4, 4, 20, 36, 52, 68, 84, 100, 116, 132, 148, 164, 180, 196, 228, 244].

Furthermore, if the predetermined frequency band is 80 MHz and the predetermined subcarrier grouping number is set as Ng, the predetermined subcarrier indices are set to [−500:Ng:−4, 4:Ng:500]. Here, the notation x:y:z corresponds to a range beginning at x and ending at z having a step size of y, i.e., if the predetermined subcarrier grouping number is set to 4, the range indicated above corresponds to [−500, −496, −492, −488, −484, −480, −476, −472, −468, −464, −460, −456, −452, −448, −444, −440, −436, −432, −428, −424, −420, −416, −412, −408, −404, −400, −396, −392, −388, −384, −380, −376, −372, −368, −364, −360, −356, −352, −348, −344, −340, −336, −332, −328, −324, −320, −316, −312, −308, −304, −300, −296, −292, −288, −284, −280, −276, −272, −268, −264, −260, −256, −252, −248, −244, −240, −236, −232, −228, −224, −220, −216, −212, −208, −204, −200, −196, −192, −188, −184, −180, −176, −172, −168, −164, −160, −156, −152, −148, −144, −140, −136, −132, −128, −124, −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 192, 196, 200, 204, 208, 212, 216, 220, 224, 228, 232, 236, 240, 244, 248, 252, 256, 260, 264, 268, 272, 276, 280, 284, 288, 292, 296, 300, 304, 308, 312, 316, 320, 324, 328, 332, 336, 340, 344, 348, 352, 356, 360, 364, 368, 372, 376, 380, 384, 388, 392, 396, 400, 404, 408, 412, 416, 420, 424, 428, 432, 436, 440, 444, 448, 452, 456, 460, 464, 468, 472, 476, 480, 484, 488, 492, 496, 500]. If the predetermined subcarrier grouping number is set to 16, the range indicated above corresponds to [−500, −484, −452, −436, −420, −404, −388, −372, −356, −340, −324, −308, −292, −276, −260, −244, −228, −212, −196, −180, −164, −148, −132, −116, −100, −84, −68, −52, −36, −20, −4, 4, 20, 36, 52, 68, 84, 100, 116, 132, 148, 164, 180, 196, 212, 228, 244, 260, 276, 292, 308, 324, 340, 356, 372, 388, 404, 420, 436, 452, 484, 500].

If the predetermined subcarrier index overlaps a pilot subcarrier index, the overlapped subcarrier index may be again reset as a neighbor subcarrier index in which an LTF coefficient is located. That is, if a feedback subcarrier and a pilot subcarrier overlap, the feedback subcarrier may be set as another adjacent index. In this case, a sample used for Q matrix forming may be increased in a transmission stage (or a beamformer).

If the predetermined subcarrier index overlaps a null subcarrier index, the overlapped subcarrier index may be again reset as a neighbor subcarrier index in which an LTF coefficient is located. That is, if a feedback subcarrier and a null subcarrier (leftover tone) overlap, another neighbor subcarrier may be added and fed back. In particular, it is necessary to additionally feed a null subcarrier back in a neighbor subcarrier because a signal is not transferred in the null subcarrier in a resource unit (RU) of a small size.

Furthermore, the channel status information includes average channel information estimated in subcarriers except the null subcarrier and the pilot subcarrier within the subcarrier group or channel information estimated in the feedback subcarrier. That is, the former can help performance because an average channel information value is fed back in all of subcarriers (in this case, except a null subcarrier and a pilot subcarrier) within the subcarrier group and a smoothing effect can be obtained. The latter has an advantage in that it can reduce overhead attributable to a computational load without a need to calculate an average channel information value of all of the subcarriers because only channel information estimated in a feedback subcarrier is fed back. The channel status information is transmitted through the feedback subcarrier.

Furthermore, the feedback request field further includes a legacy-long training field (L-LTF). The size of inverse fast Fourier transform (IFFT) applied to the LTF may be one times or twice times the size of IFFT applied to the L-LTF. That is, the aforementioned method may use an NDP to which the 1×-LTF or the 2×-LTF has been applied in order to perform a sounding procedure.

Furthermore, this specification proposes an apparatus transmitting a feedback frame in a WLAN system. The apparatus may correspond to a STA, a beamformee, etc., but is not limited thereto.

Furthermore, there is proposed a first wireless station performing communication in a WLAN system supporting a plurality of frequency resource units corresponding to different frequencies.

First, terms are summarized. The first wireless station may correspond to a beamformee or an STA, and a second wireless station may correspond to a beamformer or an AP. The different frequencies may correspond to 20 MHz, 40 MHz, 80 MHz, etc. The plurality of frequency resource units corresponding to the different frequencies may correspond to a 26-RU, a 52-RU, a 106-RU, a 242-RU, a 484-RU and/or a 996-RU.

The apparatus includes a radio frequency (RF) unit transmitting and receiving radio signals and a processor operatively coupled to the RF unit.

The processor first receives a feedback request field, including a long training field (LTF), from the second wireless station. The feedback request field including the LTF may correspond to a null data packet (NDP).

The processor configures feedback information regarding a radio channel corresponding to a predetermined frequency band using the feedback request field.

The processor transmits the feedback information to the second wireless station.

The feedback information includes channel status information about a predetermined subcarrier index. The predetermined subcarrier index may correspond to the feedback subcarrier index. Furthermore, the predetermined subcarrier index is determined depending on a predetermined subcarrier grouping number. That is, the channel status information indicates a feedback subcarrier for each subcarrier group. In other words, the channel status information indicates that a feedback subcarrier is allocated where within a frequency band.

The subcarrier group is generated from subcarriers except a guard subcarrier and DC carrier within a frequency band based on grouping information. That is, the predetermined subcarrier index may be determined depending on the predetermined subcarrier grouping number other than a guard subcarrier and a DC subcarrier.

As a detailed example, if the predetermined frequency band is 20 MHz and the predetermined subcarrier grouping number is set to 4, the predetermined subcarrier indices are set to [−122, −120:4:−4, −2, 2, 4:4:120, 122].

Furthermore, if the predetermined frequency band is 20 MHz and the predetermined subcarrier grouping number is set to 16, the predetermined subcarrier indices are set to [−122, −116:16:−4, −2, 2, 4:16:116, 122].

In this case, if the predetermined frequency band is 20 MHz and the predetermined subcarrier grouping number is set to 4 or 16, [−122, −2, 2, 122] of the predetermined subcarrier indices may be used to perform interpolation for channel estimation.

Furthermore, if the predetermined frequency band is 40 MHz and the predetermined subcarrier grouping number is set as Ng, the predetermined subcarrier indices are set to [−244:Ng:−4, 4:Ng:244].

Furthermore, if the predetermined frequency band is 80 MHz and the predetermined subcarrier grouping number is set as Ng, the predetermined subcarrier indices are set to [−500:Ng:−4, 4:Ng:500].

If the predetermined subcarrier index overlaps a pilot subcarrier index, the overlapped subcarrier index may be again reset as a neighbor subcarrier index in which an LTF coefficient is located. That is, if a feedback subcarrier and a pilot subcarrier overlap, the feedback subcarrier may be set as another adjacent index. In this case, a sample used for Q matrix forming may be increased in a transmission stage (or a beamformer).

If the predetermined subcarrier index overlaps a null subcarrier index, the overlapped subcarrier index may be again reset as a neighbor subcarrier index in which an LTF coefficient is located. That is, if a feedback subcarrier and a null subcarrier (leftover tone) overlap, another neighbor subcarrier may be added and fed back. In particular, it is necessary to additionally feed a null subcarrier back in a neighbor subcarrier because a signal is not transferred in the null subcarrier in a resource unit (RU) of a small size.

Furthermore, the channel status information includes average channel information estimated in subcarriers except the null subcarrier and the pilot subcarrier within the subcarrier group or channel information estimated in the feedback subcarrier. That is, the former can help performance because an average channel information value is fed back in all of subcarriers (in this case, except a null subcarrier and a pilot subcarrier) within the subcarrier group and a smoothing effect can be obtained. The latter has an advantage in that it can reduce overhead attributable to a computational load without a need to calculate an average channel information value of all of the subcarriers because only channel information estimated in a feedback subcarrier is fed back. The channel status information is transmitted through the feedback subcarrier.

Furthermore, the feedback request field further includes a legacy-long training field (L-LTF). The size of inverse fast Fourier transform (IFFT) applied to the LTF may be one times or twice times the size of IFFT applied to the L-LTF. That is, the aforementioned method may use an NDP to which the 1×-LTF or the 2×-LTF has been applied in order to perform a sounding procedure.

Advantageous Effects

If the method proposed in this specification is used, beamforming feedback tone indices can be efficiently configured by taking into consideration a relation between a pilot tone and a leftover tone in the 802.11ax system, and feedback overhead when a beamformee transmits a feedback frame can be reduced.

DESCRIPTION OF DRAWINGS

FIG. 1 is a conceptual view illustrating the structure of a wireless local area network (WLAN).

FIG. 3 is a diagram illustrating an example of an HE PDDU.

MODE FOR INVENTION

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA is a predetermined functional medium including medium access control (MAC) complying with the regulations of Institute of Electrical and Electronics Engineers (IEEE) 802.11 standard and a physical layer interface for a radio medium, and may be used as a meaning including all of APs and non-AP stations (STAs).

The STA may be called various names, such as a mobile terminal, a wireless device, a wireless transmit/receive unit (WTRU), user equipment (UE), a mobile station (MS), a mobile subscriber unit and simply a user.

Figure 2:
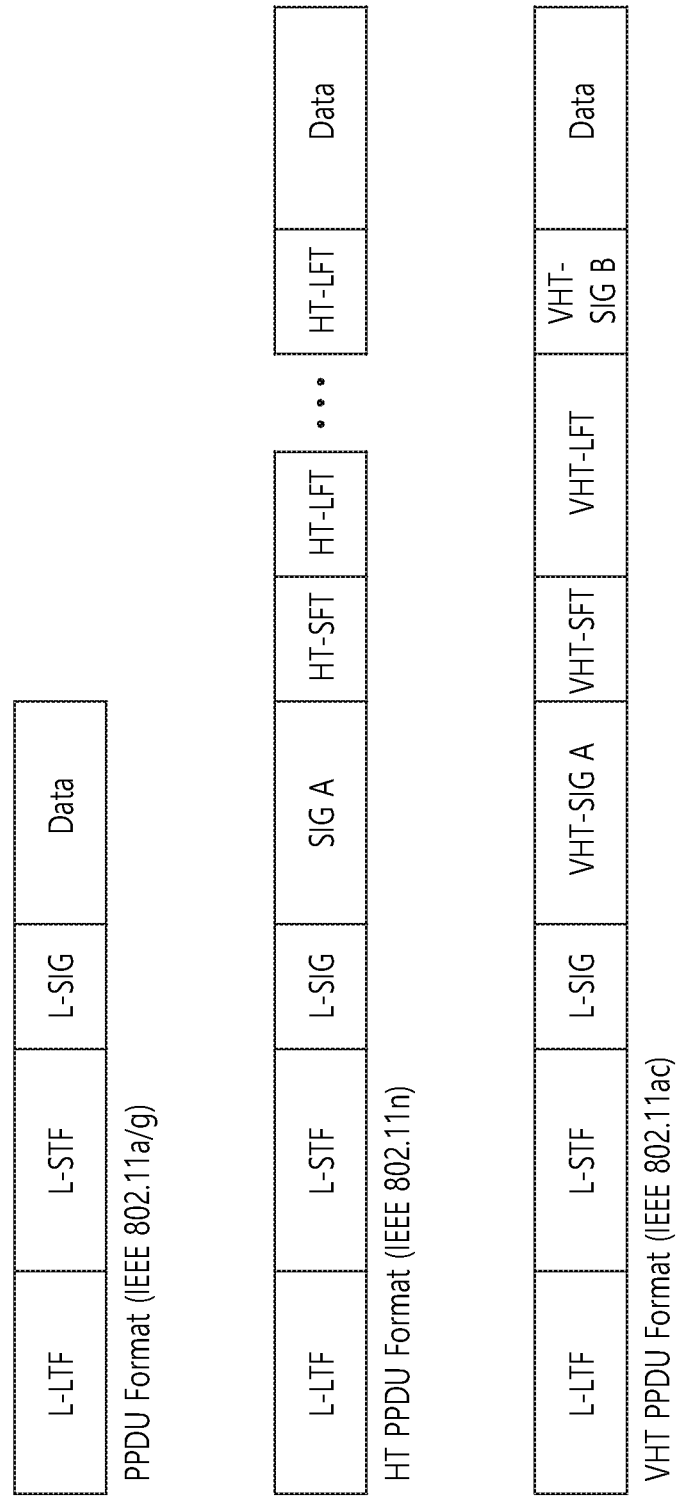
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
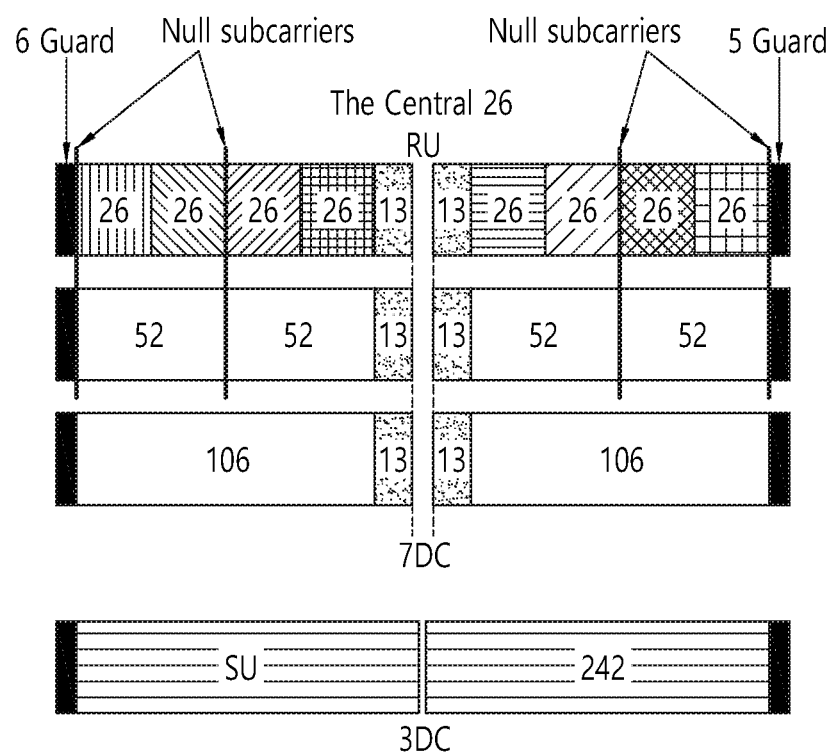
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
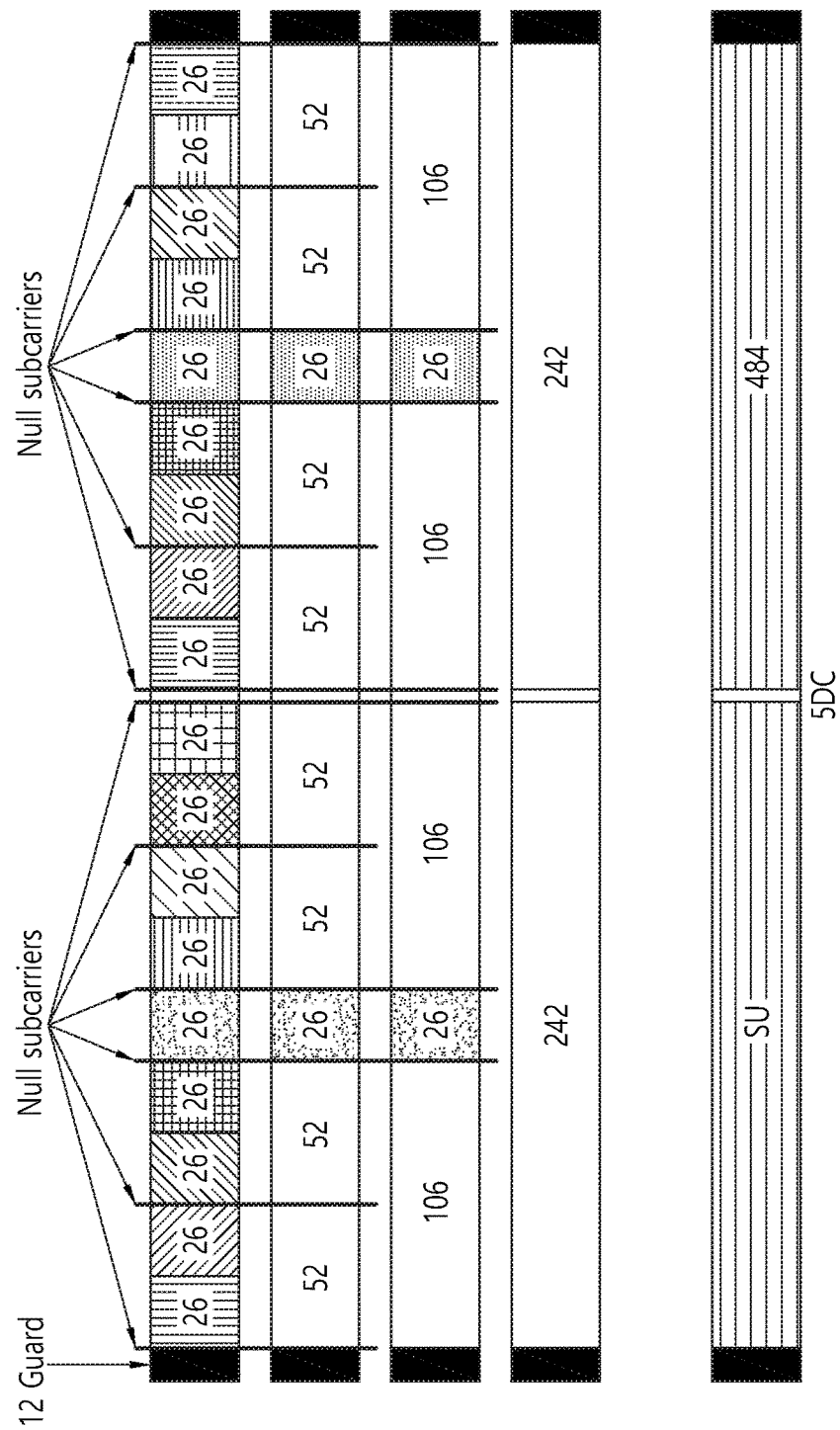
FIG. 5 is a diagram illustrating a layout of resource units (RUs) used in a band of 40 MHz.

FIG. 5 is a diagram illustrating the layout of resource units (RUs) used in a band of 40 MHz.

Similar to the case where the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
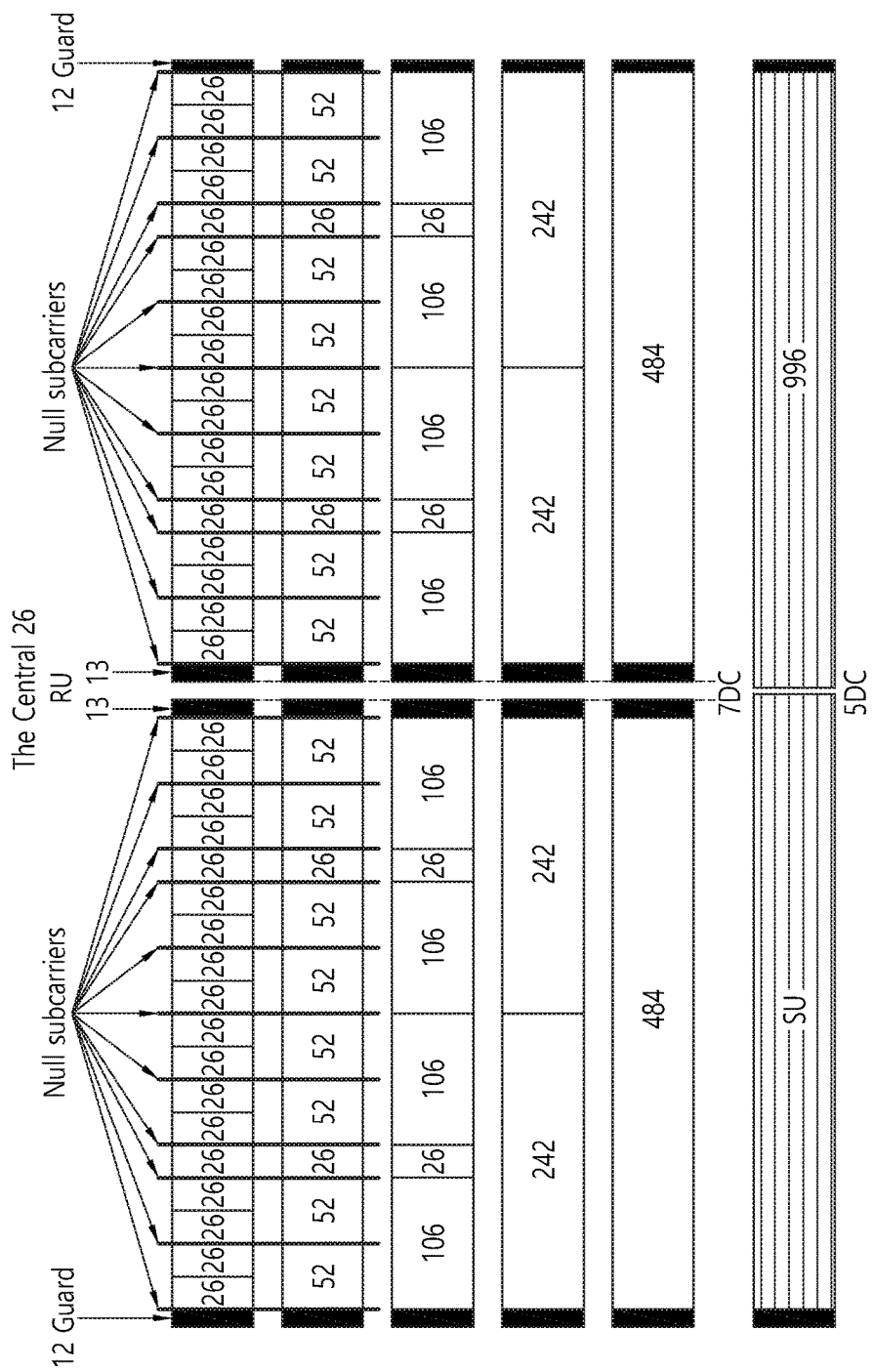
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
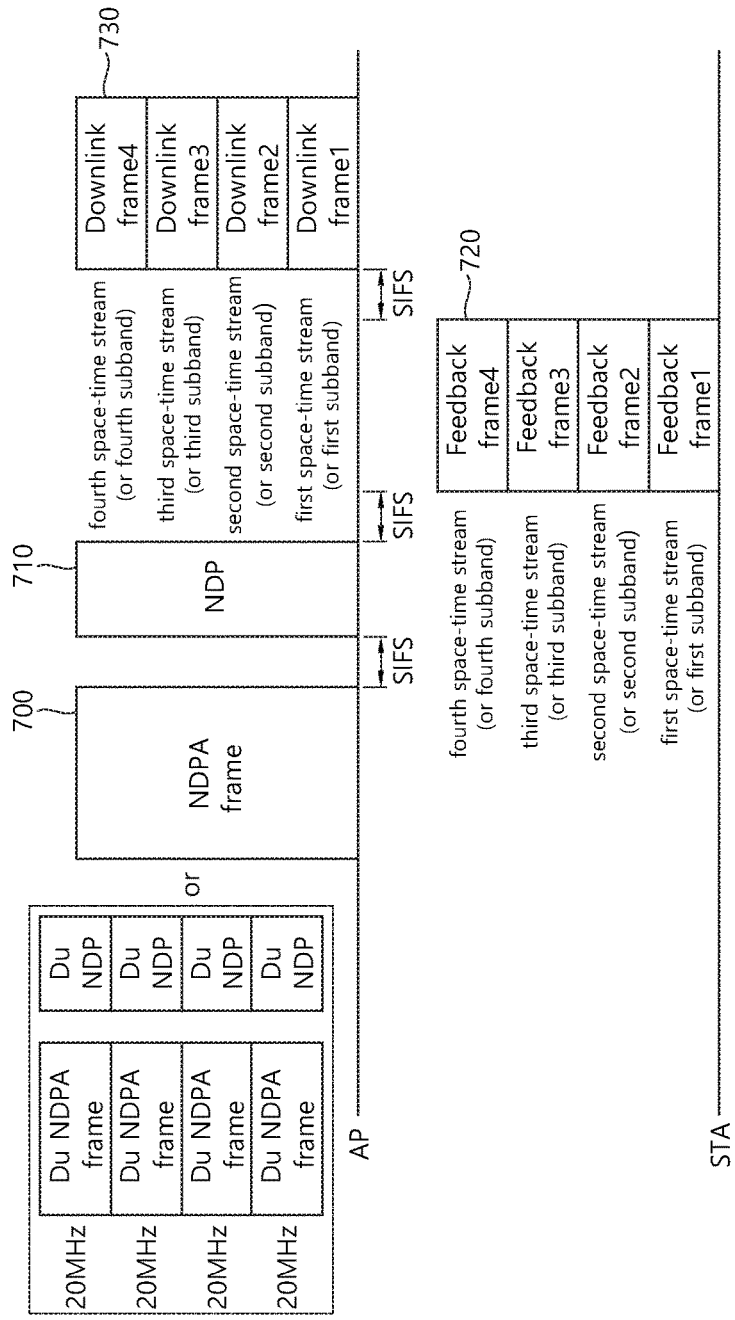
FIG. 7 is a concept view illustrating a method of transmitting a frame on the basis of a sounding procedure according to an embodiment of the present invention.

FIG. 7 is a concept view illustrating a method of transmitting a frame on the basis of a sounding procedure according to an embodiment of the present invention.

Disclosed in FIG. 7 is a method of transmitting a frame on the basis of a sounding procedure for a single STA. The sounding procedure may be a procedure for acquiring channel state information. More specifically, disclosed is a method in which an AP performs the sounding procedure with respect to the STA, and transmits a downlink frame to the STA through SU-MIMO (or OFDMA) or MU-MIMO according to feedback information acquired on the basis of the sounding procedure.

The AP may transmit a null data packet announcement (NDPA) frame 700 to the STA for the sounding procedure, and may transmit an NDP 710 after a specific time (e.g., a short interframe space (SIFS)).

The NDPA frame 700 may be used to report to the STA that the sounding procedure starts and the NDP 710 is transmitted. The NDPA frame 700 may include an STA information field. The STA information field may indicate an STA for receiving the NDP 710 to be transmitted after the NDPA frame 700 and for transmitting a feedback frame. The STA indicated on the basis of the STA information field may estimate a channel on the basis of the NDP 710 and may transmit a feedback frame 720 including the channel state information to the AP. That is, the STA may determine whether to transmit the feedback frame 720 to the AP by participating in channel sounding on the basis of the STA information field included in the received NDPA frame 700.

The NDP 710 may have a format which includes only a PPDU header by omitting a data field from the typical PPDU. The NDP 710 may be precoded by the AP on the basis of a specific precoding matrix. Upon receiving the NDP 710, the STA may estimate a channel on the basis of a training field (e.g., HE-LTF) of the NDP 710 and may acquire channel state information. Since the NDP 710 does not have the data field, length information indicating a PSDU length included in the data field of the NDP 710 or a length of an aggregate-MAC protocol data unit (A-MPDU) included in the PSDU may be set to 0.

Each of the NDPA frame 700 and the NDP 710 may be transmitted through a full bandwidth for transmission of the NDPA frame 700 and the NDP 710. The PPDU format may be expressed by the term 'non-duplicated PPDU format'.

Alternatively, each of the NDPA frame 700 and the NDP 710 may be transmitted through a plurality of channels on the basis of a duplicate PPDU format. The duplicate PPDU format may be transmitted through a bandwidth greater than 20 MHz (e.g., 40 MHz, 80 MHz, 160 MHz, 80 MHz+80 MHz, etc.) by replicating the PPDU format transmitted through an adjacent channel (or a primary channel) (20 MHz). When a duplicate format 450 is used, the same data may be transmitted through each of a plurality of channels (a replication target channel and a replication channel). That is, an NDPA PPDU (or NDP) may be used based on a duplicate format used to carry replicated information through each of a plurality of channels. The NDPA frame 700 and the NDP 710 having the non-duplicate PPDU format or the duplicate PPDU format may be transmitted to at least one STA through at least one space-time stream. If the AP receives a feedback frame from a single STA as shown in FIG. 7, the AP may transmit the NDPA frame 700 and the NDP 710 to the single STA through at least one stream. If the AP receives the feedback frame from the single STA, the NDPA frame 700 may indicate at least one STA for transmitting the feedback frame. An LTF may be transmitted through at least one space-time stream through the NDP 710, and the STA may transmit to the AP a feedback frame including channel state information measured on the basis of the LTF of an indicated space-time stream and an indicated frequency domain.

Alternatively, the NDPA frame 700 and the NDP 710 may be transmitted based on a DL MU transmission method. More specifically, the NDPA frame 700 and the NDP 710 may be transmitted to a plurality of STAs through different space-time streams on the basis of DL MU MIMO transmission, or may be transmitted to the plurality of STAs through different frequency resources (or a subband, a channel) on the basis of DL MU OFDMA. In this case, the NDPA frame 700 and the NDP 710 transmitted through the different space-time streams or the different frequency resources may include different information. That is, the AP may transmit a plurality of NDPA frames respectively to the plurality of STAs, and may transmit a plurality of NDPs respectively to the plurality of STAs. For example, the NDPA frame transmitted through a specific space-time stream or a specific frequency resource may indicate only a specific STA for transmitting a feedback frame.

Hereinafter, an embodiment of the present invention is described for convenience of explanation by assuming a case where an NDPA frame and an NDP are transmitted to at least one STA through at least one stream on the basis of a non-duplicate PPDU format or a duplicate PPDU format.

The STA may perform channel estimation on the basis of the NDP 710, and may transmit acquired channel state information to the AP through the feedback frame 720. A channel bandwidth used for transmission of the feedback frame 720 may be set to be narrower than or equal to a channel bandwidth used for transmission of the NDPA frame 700. The feedback frame 720 may include channel state information (or stream state information) for each of an indicated space-time stream (or spatial stream).

If the NDP 710 is not transmitted based on beamforming, the feedback frame 720 may include a high throughput (HT) control field and a channel information control field (e.g., very high throughput (VHT) MIMO control field or an HE MU control field). The HT control field may include information regarding Nsts (the number of space-time streams), MCS, bandwidth (BW), and SNR. The control information control field may be reserved.

If the NDP 710 is transmitted based on beamforming, the feedback frame 720 may include an HT control field, a channel information control field, and a channel information field. The HT control field may include information regarding Nsts, MCS, BW, and SNR. The channel control field may include information regarding Nc, Nr, Ng, etc., and/or control information for OFDMA-based transmission. The channel information control field may include SNR information per stream, information of a beamforming feedback matrix for each subcarrier, SNR information for each frequency resource (e.g., subband) in OFDMA-based transmission, etc.

A format of the NDPA frame 700, the NDP 710, and the feedback frame 720 is described later in detail.

According to the embodiment of the present invention, upon receiving the NDAP 710, the STA may transmit the feedback frame 720 to the AP after a specific time (e.g., SIFS). The AP may receive the feedback frame 720, and after the specific time (e.g., SIFS), may transmit a downlink frame 730 to the STA on the basis of SU MIMO (or OFDMA/MU-MIMO). The AP may transmit the downlink frame 730 generated based on channel variation information determined by considering channel state information included in the feedback frame 720.

The STA may transmit an ACK or a block ACK to the AP in response to the received downlink frame 730.

If the downlink frame 730 transmitted by the AP receives the feedback frame 720 and is transmitted after the SIFS, a feedback channel state parameter (e.g., Nsts, MCS, BW, SNR, Nc, Nr, Ng, SNR information per stream, information of a beamforming feedback matrix for each subcarrier, SNR information for each frequency resource (e.g., subband) in OFDMA-based transmission, etc.) is relatively accurate, and thus data transmission efficiency may be increased.

Hereinafter, FIG. 8 to FIG. 10 disclose the NDPA PPDU and NPD 710 for carrying the NDPA frame 700 to perform the sounding procedure and the feedback PPDU for carrying the feedback frame 720 in detail according to an embodiment of the present invention.

Figure 8:
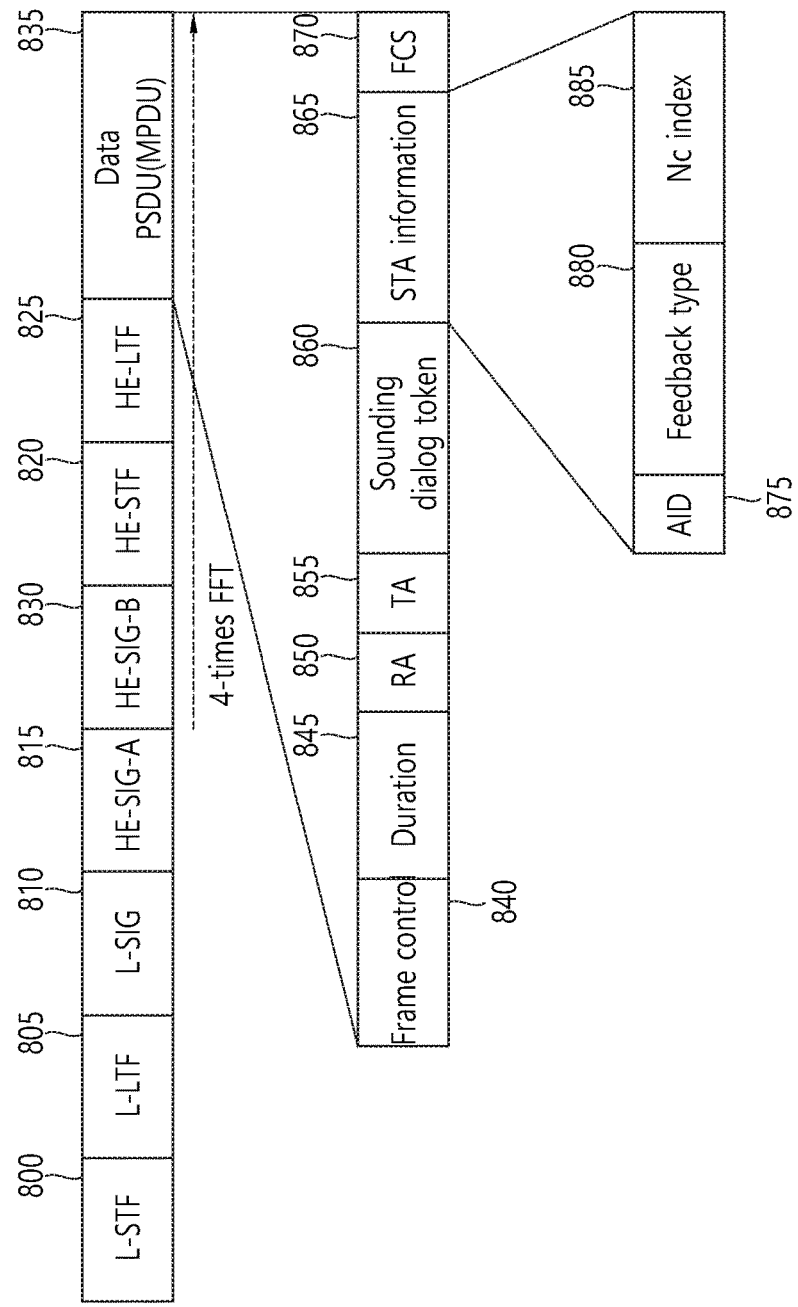
FIG. 8 is a concept view illustrating a format of a null data packet announcement (NDPA) PLCP protocol data unit (PPDU) according to an embodiment of the present invention.

FIG. 8 is a concept view illustrating a format of an NDPA PPDU according to an embodiment of the present invention.

Referring to an upper part of FIG. 8, the NDPA PPDU may include a PPDU header and a PSDU (or MPDU). The PPDU header used herein may include a PHY preamble and a PHY header. A PSDU (or MPDU) of the NPDA PPDU may include an NDPA frame.

The PPDU header of the NDPA PPDU may include a legacy-short training field (L-STF) 800, a legacy-long training field (L-LTF) 805, a legacy-signal (L-SIG) 810, a high efficiency-signal A (HE-SIG A) 815, a high efficiency-signal B (HE-SIG B) 830, a high efficiency-short training field (HE-STF) 820, a high efficiency-long training field (HE-LTF) 825. The PHY header may be divided into a legacy part before the L-SIG 810 and a high efficiency (HE) part after the L-SIG 810.

The L-STF 800 may include a short training orthogonal frequency division multiplexing (OFDM) symbol. The L-STF 800 may be used for frame detection, automatic gain control (AGC), diversity detection, and coarse frequency/time synchronization.

The L-LTF 805 may include a long training OFDM symbol. The L-LTF 805 may be used for fine frequency/time synchronization and channel prediction.

The L-SIG 810 may be used to transmit control information. The L-SIG 810 may include information for a data rate and a data length.

The HE-SIG A 815 may include information indicating an STA for receiving a PPDU. More specifically, the HE-SIG A 815 may include information indicating an STA for receiving an NDPA frame.

In addition, the HE-SIG A 815 may include color bits information for BSS identification information, bandwidth information, a tail bit, a CRC bit, modulation and coding scheme (MCS) information for the HE-SIG B 830, symbol count information for the HE-SIG B 830, and cyclic prefix (CP) (or guard interval (GI)) length information.

The HE-STF 820 may be used to improve automatic gain control estimation in a multiple input multiple output (MIMO) environment or an OFDMA environment.

The HE-LTF 825 may be used to estimate a channel in the MIMO environment or the OFDMA environment.

The HE-SIG B 830 may include a length of physical layer service data unit (PSDU) for each STA, information regarding modulation and coding scheme (MCS), a tail bit, or the like.

A size of inverse fast Fourier transform (IFFT) applied to the HE-STF 820 and a field which comes after the HE-STF 820 may be different from a size of IFFT applied to a field which comes before the HE-STF 820. For example, the size of IFFT applied to the HE-STF 820 and the field which comes after the HE-STF 820 may be four times greater than the size of IFFT applied to the field which comes before the HE-STF 820. The STA may receive the HE-SIG A 815, and may be instructed to receive a downlink PPDU on the basis of the HE-SIG A 815. In this case, the STA may perform decoding on the HE-STF 820 and the field which comes after the HE-STF 820 on the basis of a changed FFT size. On the contrary, if the STA is not instructed to receive the downlink PPDU on the basis of the HE-SIG A 815, the STA may stop decoding and may configure a network allocation vector (NAV). A cyclic prefix (CP) of the HE-STF 820 may have a size greater than a CP of another field, and for this CP duration, the STA may perform decoding on the downlink PPDU by changing the FFT size.

An order of a field constructing the aforementioned NDPA PPDU format may be changed.

For example, an HE-SIG B of an HE part should be located immediately after an HE-SIG A. That is, each field of the HE part may be located in the order of HE-SIG A, HE-SIG B, HE-STF, HE-LTF. The STA may perform decoding on the HE-SIG and up to the HE-SIG B, may receive necessary control information, and may configure an NAV. Likewise, a size of IFFT applied to an HE-STF and a field which comes after the HE-STF may be different from a size of IFFT applied to a field which comes before the HE-STF. The STA may receive the HE-SIG A and the HE-SIG B. If it is instructed to receive the downlink PPDU by the STA identifier field of the HE-SIG A, the STA may perform decoding on the downlink PPDU starting from the HE-STF by changing the FFT size. On the contrary, the STA may receive the HE-SIG A, and if it is not instructed to receive the downlink PPDU on the basis of the HE-SIG A, may configure the NAV.

A PSDU (or MPDU) 835 of the NDPA PPDU may include the NDPA frame. The NDPA frame may include a frame control field 840, a duration field 845, an RA field 850, a TA field 855, a sounding dialog token field 860, an STA information field 865, and an FCS 870.

The frame control field 840 may include a type and subtype for indicating the NDPA frame.

The duration field 845 may include information regarding a duration for protecting transmission of the NDPA frame.

The RA field 850 may include identification information of an STA for receiving the NDPA frame. For example, when the STA information field includes information regarding a single STA, the RA field 850 may include address information of the STA. If the STA information field 865 includes information regarding a plurality of STAs, the RA field 850 may include a broadcast address of the STA. For example, the RA field 850 may include MAC address information of the STA for receiving the NDPA frame.

The TA field 855 may include an address of an AP for transmitting the NDPA frame.

The sounding dialog token field 860 may include information used by the AP for transmitting the NDPA frame to identify the NDPA frame.

The STA information field 865 may include identification information (AID) 875, feedback type information 880, and Nc index information 885 of the STA for receiving the NDPA frame.

Table 1 below discloses information included in the STA information field.

TABLE 1

| Subfield | Description |
| --- | --- |
| AID | Assoication identifier (AID) of STA for performing sounding procedure (for receiving an NDP to be transmitted later) is included |
| Feedback type | Indicate feedback request type of STA for performing souding procedure<br>Set to '0' in case of SU-MIMO<br>Set to '1' in case of MU-MIMO |
| Nc index | Inidicate requested feedback dimension (information regarding the number of columns of beamforming feedback matrix)<br>In case of MU-MOMO:<br>Set to '0' if Nc = 1<br>Set to '1' if Nc = 2<br>Set to '2' if Nc = 3<br>Set to '3' if Nc = 4<br>Set to '4' if Nc = 5<br>Set to '5' if Nc = 6<br>Set to '6' if Nc = 7<br>Set to '7' if Nc = 8<br>In case of SU-MIMO, reserved subfield (Set to 0) |

In Table 1, Nc may indicate the number of columns of beamforming feedback matrices included in a feedback frame transmitted in response to an NDP.

Upon receiving the NDPA frame, STAs may confirm an AID sub-field value included in an STA information field, and may confirm whether it is a sounding target STA.

FIG. 8 is one example for an NDPA PPDU. The NDPA PPDU may have a legacy PPDU format (e.g., an HT PPDU format or a VHT PPDU format) instead of the HE-SIG A 815, the HE-STF 820, the HE-LTF 825 and the HE-SIG B 830.

Figure 9:
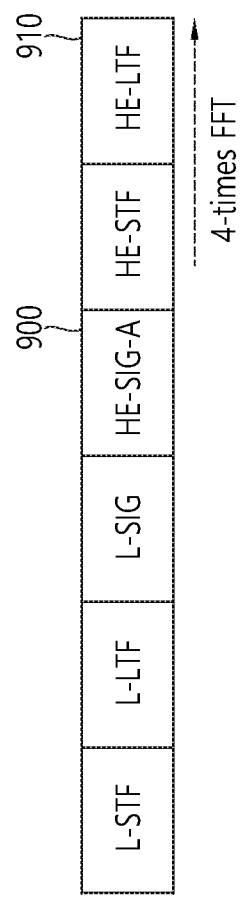
FIG. 9 is a concept view illustrating a null data packet (NDP) according to an embodiment of the present invention.

FIG. 9 is a concept view illustrating an NDP according to an embodiment of the present invention.

Referring to FIG. 9, the NDP may include only a PPDU header except for a PSDU (or MPDU).

As described above, the NDP (or PPDU header) may include a legacy part and a non-legacy part. Each field included in the legacy part and the non-legacy part may perform a role described above in FIG. 8 for transmission of the NDP.

For example, an HE-SIG A 900 may include information indicating an STA for receiving the NDP.

An HE-LTF 910 may be used for channel estimation of the STA. That is, the STA may perform channel estimation on the basis of the HE-LTF 910 included in the NDP frame, and may generate a feedback frame based on the results of the channel estimation.

As described above in FIG. 8, the sequence of some fields included in the aforementioned NDP may be changed. That is, each of the fields of the PPDU header may be located in order of the HE-SIG A, the HE-STF and the HE-LTF.

Figure 10:
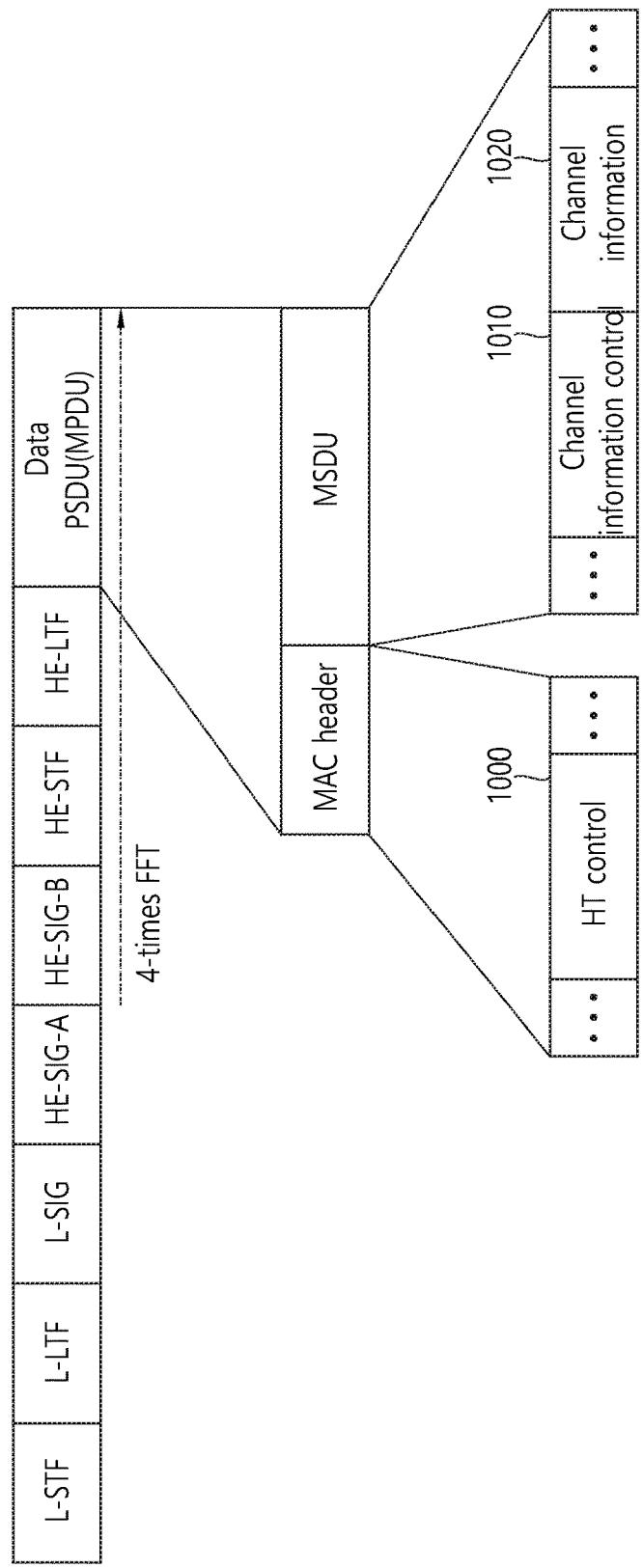
FIG. 10 is a concept view illustrating a feedback PPDU according to an embodiment of the present invention.

FIG. 10 is a concept view illustrating a feedback PPDU according to an embodiment of the present invention.

Referring to FIG. 10, the feedback PPDU may include a PPDU header and a PSDU (or MPDU). The PSDU (or MPDU) of the feedback PPDU may include a feedback frame.

The PPDU header of the feedback PPDU may include a legacy part and a non-legacy part. Each field included in the legacy part and the non-legacy part may perform a role described above in FIG. 8 for the feedback PPDU.

A MAC header of the feedback frame may include an HT control field 1000, and the MSDU may include a channel information control field 1010 and a channel information field 1020. If beamforming is not used in the sounding procedure as described above, the channel information control field 1010 and the channel information field 1020 may not be included in the feedback frame or may be reserved, and the feedback frame may include only the HT control field 1000. Only when the beamforming is used in the sounding procedure, the feedback frame may include the channel information control field 1010 and the channel information field 1020.

The HT control field 1010 may include an MCS feedback (MFB) field. The MFB field may include information N_STS regarding the number of recommended space-time streams, information MCS regarding a recommended MCS index, information BW regarding a bandwidth size intended by a recommended MCS, and information regarding an average SNR measured on all space-time streams and sub-carriers for transmitting data.

Table 2 and Table 3 show a format of the channel information control field 1010 and the channel information field 1020.

Table 2 below discloses information included in the channel information control field 1010.

TABLE 2

| Subfield | Description |
| --- | --- |
| Nc index | Inidicate a value obtained by subtracting 1 from the number Nc of columns of a beamforming feedback matrix<br>Set to 0 if Nc = 1<br>Set to 1 if Nc = 2<br>. . .<br>Set to 7 if Nc = 8 |
| Nr index | Inidicate a value obtained by subtracting 1 from the number Nrc of rows of a beamforming feedback matrix<br>Set to 0 if Nc = 1<br>Set to 1 if Nc = 2<br>. . .<br>Set to 7 if Nc = 8 |

TABLE 2-continued

| Subfield | Description |
| --- | --- |
| Channel bandwidth | Indicate a size of a channel bandwidth measured for generation of a beamforming feedback matrix<br>Set to 0 if 20 MHz<br>Set to 1 if 40 MHz<br>Set to 2 if 80 MHz<br>Set to 3 if 160 MHz or 80 + 80 MHz |
| Grouping, Ng | Inidicate subcarrier grouping used for a beamforming feedback matrix<br>Set to 0 if Ng = 1 (no grouping)<br>Set to 1 if Ng = 2<br>Set to 2 if Ng = 4<br>(3 is reserved) |
| Codebook information | Inidicate a size of codebook entries |
| Feedback type | Inidicate whether it is beamforming feedback for SU-MIMO or beamforming feedback for MU-MIMO |
| Sounduing sequence | Sequency number from NDPA for requesting feedback |

Table 3 below describes information included in the channel information field 1020.

TABLE 3

| Subfield | Description |
| --- | --- |
| SNR(signal to noise ratio) of spatial stream 1 | Average SNR on subcarriers in recipient for spatial stream 1 |
| . . . | . . . |
| SNR of spatial stream Nc | Average SNR on subcarriers in recipient for spatial stream Nc |
| Beamforming feedback matrix (subcarrier index 0) | Order of angles for determining beamforming feedback matrix for corresponding subcarrier |
| Beamforming feedback matrix (subcarrier index 1) | Order of angles of beamforming feedback matrix for corresponding subcarrier |
| . . . | . . . |
| Beamforming feedback matrix (subcarrier index Ns) | Order of angles of beamforming feedback matrix for corresponding subcarrier |
| SNR(signal to noise ratio) of subband 1 | Average SNR on subcarrier included in subband 1 in recipient |
| . . . | . . . |
| SNR of subband Nk subband Nk in recipient | Average SNR on subcarrier included in |

Information of the channel information field 1020 disclosed in Table 3 may be interpreted on the basis of information included in the channel control field 1010 disclosed in Table 2. For example, the AP may receive a feedback frame, and a subcarrier index Ns may be determined on the basis of channel bandwidth information and grouping information of the channel information control field 1010.

According to another embodiment of the present invention, in the grouping field Ng, a reserved 3(0x11) may be used for a subband-unit feedback. If the grouping field Ng is 3, it may indicate the subband-unit feedback. If Ng=3, an SNR or a beamforming feedback matrix (or a matrix vector) may be fed back in a subband unit. For example, a subband unit for a feedback may be fixed in unit of 26 tones or may be set to an additional unit (e.g., a tone corresponding to a multiple unit of 26 tones) on the basis of an additional subband related field.

In addition, an SNR or a beamforming feedback matrix (or a matrix vector) for a full frequency band may be transmitted through a feedback PPDU irrespective of whether grouping is achieved.

In addition, an Nc index count may be defined as not being singular (e.g., Nc) but being plural (e.g., Nc1, Nc2, etc.), and thus a plurality of pieces of feedback information corresponding to the plurality of Nc may be included in the feedback frame.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively downlink frame and downlink PPDU) to the plurality of respective STAs through the plurality of respective frequency resources on an overlapped time resource. The plurality of frequency resources may be a plurality of subbands (alternatively subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 11:
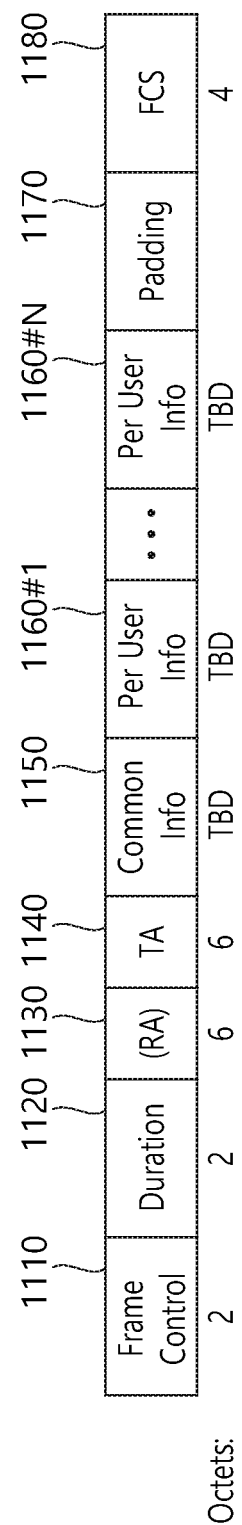
FIG. 11 is a conceptual diagram showing a method for transmitting an SU-MIMO frame based on a sounding procedure according to the present embodiment.

FIG. 11 illustrates an example of a trigger frame. The trigger frame of FIG. 11 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 11 may be partially omitted, or other fields may be added. Moreover, the length of each field may be varied differently as shown in the drawing.

A Frame Control field 1110 shown in FIG. 11 may include information related to a version of the MAC protocol and other additional control information, and a Duration field 1120 may include time information for configuring a NAV or information related to an identifier (e.g., AID) of the user equipment.

Additionally, a RA field 1130 may include address information of a receiving STA of the corresponding trigger frame, and this field may also be omitted as required. A TA field 1140 may include address information of the STA (e.g., AP) transmitting the corresponding trigger frame, and a common information field 1150 may include common control information that is applied to the receiving STA receiving the corresponding trigger frame.

Figure 12:
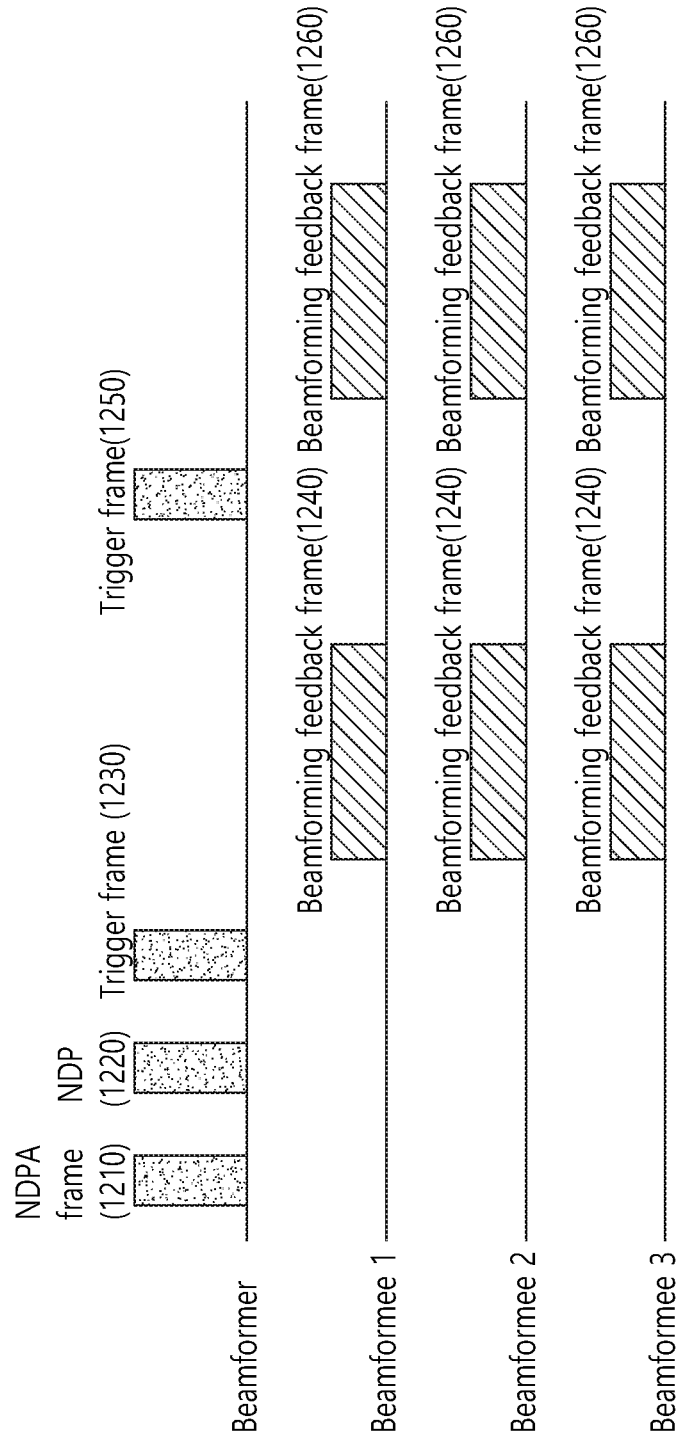
FIG. 12 is a conceptual diagram showing a method for transmitting an MU-MIMO frame based on a sounding procedure according to the present embodiment.

FIG. 12 is a conceptual diagram showing a method for transmitting an MU-MIMO frame based on a sounding procedure according to the present embodiment.

FIG. 12 discloses a method for transmitting a frame based on a sounding procedure for a plurality of STAs. More specifically, a beamformer that has transmitted an NDPA frame 1210 having at least one STA information field may transmit a beamforming report poll trigger frame 1230 after an SIFS since the NDP frame 1210 was transmitted. This reason for this is that the beamformer receives a beamforming feedback frame 1240 from a beamformee designated in the same TXOP. Furthermore, the beamformer receive the beamforming feedback frame 1240 and then may transmit an additional beamforming report poll trigger frame after an SIFS. The reason for this is that the beamformer subsequently receives beamforming feedback from the beamformee differently designated in the same TXOP.

That is, the beamformee may transmit a beamforming feedback frame in response to the beamforming report poll trigger frame (or the trigger frame). The beamforming report poll trigger frame includes the AID of an STA included in the user information fields 1160#1, . . . , 1160#N shown in FIG. 11.

In the 802.11ac system, in order to perform beamforming, feedback is transmitted using carrier grouping. In this case, the number of carrier groupings used (i.e., Ng) is 1, 2 or 4 regardless of a band used for data transmission. In contrast, in the 802.11ax system, in order to enhance efficiency of data transmission, feedback is transmitted using a 4× symbol structure and OFDMA compared to 802.11ac. In this case, if data is transmitted by performing beamforming, there is a need for a feedback method for performing efficient beamforming. Accordingly, this specification proposes a method for applying an efficient beamforming feedback tone index and a Q matrix, which can reduce feedback overhead, by taking into consideration a transmission method in the 802.11ax system. In this case, it is assumed that an NDP to which a 1×, 2×, 4×HE-LTF has been applied is used for sounding.

The method for applying a feedback tone index and a Q matrix is as follows.

A beamformee performs channel estimation through NDP sounding in all of subcarriers other than a guard subcarrier (or a guard tone), a DC subcarrier (or a DC tone), a pilot subcarrier (or a pilot tone), and a null subcarrier (or a leftover tone), and feeds channel information back. The fed-back channel information may include information, such as channel quality information (CQI) and/or channel directional information (CDI). A beamformer forms a Q matrix using information fed back in all of subcarriers other than a guard subcarrier, a DC subcarrier, a pilot subcarrier, and a null subcarrier, and applies the Q matrix upon data transmission.

Hereinafter, there is proposed a method for applying a unified feedback tone index, which is used in a situation in which OFDMA is used in addition to a full bandwidth (or non-OFDMA). In a negative part and a positive part, a feedback tone index is symmetric.

Specifically, this specification proposes a method of applying a feedback tone index for 20 MHz, 40 MHz and 80 MHz transmission. Furthermore, when a 1×HE-LTF and a 2× HE-LTF are used, a situation in which feedback is performed in the position where an HE-LTF coefficient is present is considered. That is, there is a proposed method of applying a feedback tone index after sounding in an NDP using a 1×HE-LTF and there is proposed a method of applying a feedback tone index after sounding in an NDP using a 2×HE-LTF.

In this case, if the 1×HE-LTF is used, Ng=4, 8, 16 may be considered. In the 1× HE-LTF, Ng=2 is not considered because an HE-LTF coefficient is inserted in a 4-blank unit. Furthermore, if the 2×HE-LTF is used, Ng=2, 4, 8, 16 may be considered. In the 2×HE-LTF, Ng=2 may also be considered because an HE-LTF coefficient is inserted in a 2-blank unit.

Furthermore, in the method, a feedback tone is set simply in an Ng unit. In the method, if a feedback tone overlaps a pilot tone, a feedback tone is set as another tone index. In this case, a sample used for Q matrix forming in a transmission stage (or a beamformer) may be increased. In this method, if a feedback tone overlaps a leftover tone, it may be fed back in a surrounding tone. It is necessary to additionally feed a feedback tone back in a surrounding tone because a signal is not transferred in a leftover tone in a resource unit (RU) of a small size.

Example (1)—20 MHz

First, a method of configuring feedback tone indices (or feedback subcarrier indices) for transmission in the 20 MHz band is described.

Figure 13:
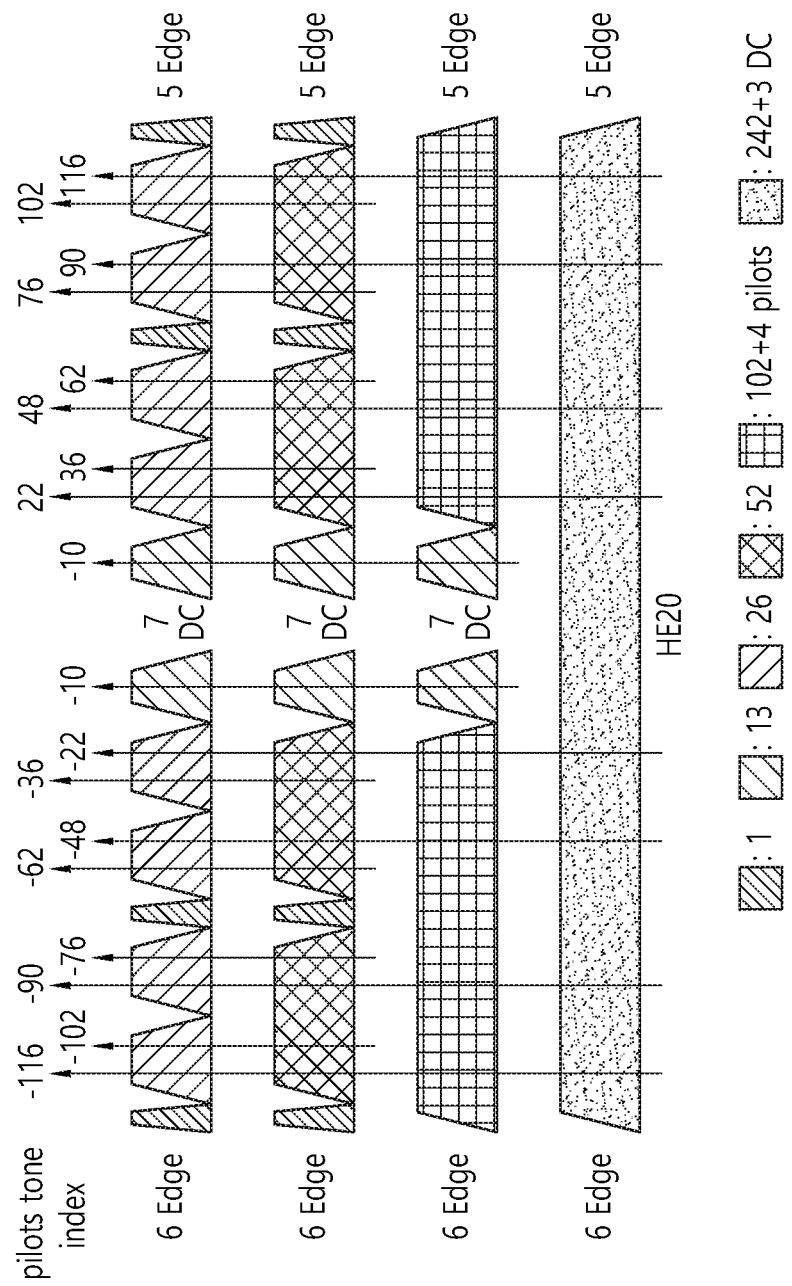
FIG. 13 is a diagram showing a pilot subcarrier index in a resource unit (RU) used on a 20 MHz band according to the present embodiment.

FIG. 13 is a diagram showing pilot subcarrier indices in a resource unit (RU) used in the 20 MHz band according to the present embodiment.

Referring to FIG. 13, if a 26-RU and/or a 52-RU is used in the 20 MHz band, pilot subcarrier indices may be ±{10, 22, 36, 48, 62, 76, 90, 102, 116}. If a 106-RU and/or a 242-RU (full band) is used in the 20 MHz band, pilot subcarrier indices may be ±{22, 48, 90, 116}.

(1)-A) 2×HE-LTF, Ng=2

When the 2×HE-LTF is used and Ng=2, feedback tone indices may be ±{[2] 4 6 8 10 12 14 16 18 20 24 26 28 30 32 34 36 38 40 42 44 46 50 52 54 56 58 60 62 64 66 68 70 72 74 76 78 80 82 84 86 88 92 94 96 98 100 102 104 106 108 110 112 114 118 120 [122]}.

In this case, the underlined tone index a is not fed back because it corresponds to a pilot tone index in the 26-RU or the 52-RU. In this case, the underlined tone index a may be fed back because it does not correspond to a pilot tone index in the 106-RU or the 242-RU (full band). This is applied to the following embodiment in the same manner.

Furthermore, the tone index [a] indicated by square brackets is not fed back in the 26-RU or the 52-RU because it corresponds to a leftover tone. This is applied to the following embodiment in the same manner.

Furthermore, adjustment according to pilot positions is impossible with respect to the proposed feedback tone indices. The reason for this is that replacement is impossible because there is no LTF coefficient in an odd-number tone.

(1)-B) 2×HE-LTF, Ng=4

When the 2×HE-LTF is used and Ng=4, Case 1 and Case 2 may be divided and described.

-Case 1: In a 4-blank unit from ±2

*Option 1: if adjustment according to a pilot position is not present, a feedback tone index may be ±{[2] 6 10 14 18 26 30 34 38 42 46 50 54 58 62 66 70 74 78 82 86 94 98 102 106 110 114 118 [122]}. Furthermore, if a feedback tone is added due to a leftover tone, feedback tone indices may be ±{[2] 4 6 10 14 18 26 30 34 38 42 46 50 54 58 62 66 70 74 78 82 86 94 98 102 106 110 114 118 120 [122]}. ±{4, 120} has been added.

*Option 2: if adjustment according to a pilot position is present, feedback tone indices may be ±{[2] 6 8/12 14 18 20/24 26 30 34 38 42 46 50 54 58 60/64 66 70 74 78 82 86 88/92 94 98 100/104 106 110 114 118 [122]}. In this case, the tone index indicated by a/b indicates that a corresponding tone index may be a or b. This is applied to the following embodiment in the same manner. Furthermore, if a feedback tone is added due to a leftover tone, feedback tone indices may be ±{[2] 4 6 8/12 14 18 20/24 26 30 34 38 42 46 50 54 58 60/64 66 70 74 78 82 86 88/92 94 98 100/104 106 110 114 118 120 [122]}. ±{4, 120} has been added.

-Case 2: In a 4-blank unit from ±4

*Option 1: if adjustment according to a pilot position is not present, feedback tone indices may be ±{([2]) 4 8 12 16 20 24 28 32 36 40 44 48 52 56 60 64 68 72 76 80 84 88 92 96 100 104 108 112 116 120 ([122])}. The tone index (a) indicated by parentheses indicates that the index a is additionally used. The reason why tone indices are added to both ends of a frequency band is to improve performance when interpolation for channel estimation is performed. Furthermore, to add a feedback tone is not necessary because a neighbor tone of a leftover tone is already used as a feedback tone.

*Option 2: if adjustment according to a pilot position is present, feedback tone indices may be ±{([2]) 4 8 12 16 20 24 28 32 34/38 40 44 46/50 52 56 60 64 68 72 74/78 80 84 88 92 96 100 104 108 112 114/118 120 ([122])}. Likewise, to add a feedback tone is not necessary because a neighbor tone of a leftover tone is already used as a feedback tone.

(1)-C) 1×HE-LTF, Ng=4

When the 1×HE-LTF is used and Ng=4, feedback tone indices may be ±{4 8 12 16 20 24 28 32 36 40 44 52 56 60 64 68 72 76 80 84 88 92 96 100 104 108 112 120}. In this case, adjustment according to a pilot tone position is impossible. The reason for this is that substitution is impossible because an LTF coefficient is not present in a tone other than a multiple of 4. Furthermore, to add a feedback tone is not necessary because there is no feedback tone overlapping a leftover tone.

(1)-D) 2×HE-LTF, Ng=8

When the 2×HE-LTF is used and Ng=8, Case 1, Case 2, Case 3 and Case 4 may be divided and described.

-Case 1: In an 8-blank unit from ±2

*Option 1: if adjustment according to a pilot position is not present, feedback tone indices may be ±{[2] 10 18 26 34 42 50 58 66 74 82 98 106 114 [122]} or {[2] 4 10 18 26 34 42 50 58 66 74 82 98 106 114 120 [122]}.

*Option 2: if adjustment according to a pilot position is present, feedback tone indices may be ±{[2] 8/12 18 26 34 42 50 58 66 74 82 88/92 98 106 114 [122])} or ±{[2] 4 8/12 18 26 34 42 50 58 66 74 82 88/92 98 106 114 120 [122]}.

-Case 2: In an 8-blank unit from ±4

*Option 1: if adjustment according to a pilot position is not present, feedback tone indices may be ±{([2]) 4 12 20 28 36 44 52 60 68 76 84 92 100 108 ([122])} or ±{([2]) 4 12 20 28 36 44 52 60 68 76 84 92 100 108 120 ([122])}. In this case, since the tone of an index 122 may be additionally used, the tone of an index 120 may also be used as or may not be used as a feedback tone index.

*Option 2: if adjustment according to a pilot position is present, feedback tone indices may be ±{([2]) 4 12 20 28

34/38 44 52 60 68 74/78 84 92 100 108 114/118 ([122])} or ±{([2]) 4 12 20 28 34/38 44 52 60 68 74/78 84 92 100 108 114/118 120 ([122])}.

-Case 3: In an 8-blank unit from ±6
*Option 1: if adjustment according to a pilot position is not present, feedback tone indices may be ±{([2]) 6 14 30 38 46 54 62 70 78 86 94 102 110 118 ([122])} or ±{([2]) (4) 6 14 30 38 46 54 62 70 78 86 94 102 110 118 120 ([122])}.
*Option 2: if adjustment according to a pilot position is present, feedback tone indices may be ±{([2]) 6 14 20/24 30 38 46 54 60/64 70 78 86 94 100/104 110 118 ([122])} or ±{([2]) (4) 6 14 20/24 30 38 46 54 60/64 70 78 86 94 100/104 110 118 120 ([122])}.

-Case 4: In an 8-blank unit from ±8
*Option 1: if adjustment according to a pilot position is not present, feedback tone indices may be ±{([2]) 8 16 24 32 40 56 64 72 80 88 96 104 112 120 ([122])} or ±{([2]) (4) 8 16 24 32 40 56 64 72 80 88 96 104 112 120 ([122])}.
*Option 2: if adjustment according to a pilot position is present, feedback tone indices may be ±{([2]) 8 16 24 32 40 46/50 56 64 72 80 88 96 104 112 120 ([122])} or ±{([2]) (4) 8 16 24 32 40 46/50 56 64 72 80 88 96 104 112 120 ([122])}.

(1)-E) 1×HE-LTF, Ng=8
When the 1×HE-LTF is used and Ng=8, Case 1 and Case 2 may be divided and described.

-Case 1: In an 8-blank unit from ±4
*Option 1: if adjustment according to a pilot position is not present, feedback tone indices may be ±{4 12 20 28 36 44 52 60 68 76 84 92 100 108 120}.
*Option 2: if adjustment according to a pilot position is present, feedback tone indices may be ±{4 12 20 28 32/40 44 52 60 68 72/80 84 92 100 108 112/120 120}.

-Case 2: In an 8-blank unit from ±8
*Option 1: if adjustment according to a pilot position is not present, feedback tone indices may be ±{(4) 8 16 24 32 40 56 64 72 80 88 96 104 112 120}.
*Option 2: if adjustment according to a pilot position is present, feedback tone indices may be ±{(4) 8 16 24 32 40 44/52 56 64 72 80 88 96 104 112 120}.

(1)-F) 2×HE-LTF, Ng=16
When the 2×HE-LTF is used and Ng=16, Case 1, Case 2, Case 3, Case 4, Case 5, Case 6, Case 7 and Case 8 may be divided and described.

-Case 1: In an 8-blank unit from ±2
*Option 1: if adjustment according to a pilot position is not present, feedback tone indices may be ±{[2] 18 34 50 66 82 98 114 ([122])} or ±{[2] 4 18 34 50 66 82 98 114 120 ([122])}.
*Option 2: Adjustment is not necessary because there is no tone index overlapping a pilot tone in Option 1.

-Case 2: In a 16-blank unit from ±4
*Option 1: if adjustment according to a pilot position is not present, feedback tone indices may be ±{([2]) 4 20 36 52 68 84 100 116 ([122])} or ±{([2]) 4 20 36 52 68 84 100 116 120 ([122])}.
*Option 2: if adjustment according to a pilot position is present, feedback tone indices may be ±{([2]) 4 20 34/38 52 68 84 100 114/118 ([122])} or ±{([2]) 4 20 34/38 52 68 84 100 114/118 120 ([122])}.

-Case 3: In a 16-blank unit from ±6
*Option 1: if adjustment according to a pilot position is not present, feedback tone indices may be ±{([2]) 6 38 54 70 86 102 118 ([122])} or ±{([2]) (4) 6 38 54 70 86 102 118 120 ([122])}.
*Option 2: if adjustment according to a pilot position is present, feedback tone indices may be ±{([2]) 6 20/24 38 54 70 86 100/104 118 ([122])} or ±{([2]) (4) 6 20/24 38 54 70 86 100/104 118 120 ([122])}.

-Case 4: In a 16-blank unit from ±8
*Option 1: if adjustment according to a pilot position is not present, feedback tone indices may be ±{([2]) 8 24 40 56 72 88 104 120 ([122])} or ±{([2]) (4) 8 24 40 56 72 88 104 120 ([122])}.
*Option 2: Adjustment is not necessary because there is no tone index overlapping a pilot tone in Option 1.

-Case 5: In a 16-blank unit from ±10
*Option 1: if adjustment according to a pilot position is not present, feedback tone indices may be ±{([2]) 10 26 42 58 74 106 [122]} or ±{([2]) (4) 10 26 42 58 74 106 120 [122]}.
*Option 2: if adjustment according to a pilot position is present, feedback tone indices may be ±{([2]) 8/12 26 42 58 74 88/92 106 [122]} or {([2]) 4 8/12 26 42 58 74 88/92 106 120 [122]}.

-Case 6: In a 16-blank unit from ±12
*Option 1: if adjustment according to a pilot position is not present, feedback tone indices may be ±{([2]) 12 28 44 60 76 92 108 ([122])} or ±{([2]) (4) 12 28 44 60 76 92 108 120 ([122])}.
*Option 2: if adjustment according to a pilot position is present, feedback tone indices may be ±{([2]) 12 28 44 60 74/78 92 108 ([122])} or ±{([2]) (4) 12 28 44 60 74/78 92 108 120 ([122])}.

-Case 7: In a 16-blank unit from ±14
*Option 1: if adjustment according to a pilot position is not present, feedback tone indices may be ±{([2]) 14 30 46 62 78 94 110 ([122])} or ±{([2]) (4) 14 30 46 62 78 94 110 120 ([122])}.
*Option 2: if adjustment according to a pilot position is present, feedback tone indices may be ±{([2]) 14 30 46 60/64 78 94 110 ([122])} or ±{([2]) (4) 14 30 46 60/64 78 94 110 120 ([122])}.

-Case 8: In a 16-blank unit from ±16
*Option 1: if adjustment according to a pilot position is not present, feedback tone indices may be ±{([2]) 16 32 64 80 96 112 ([122])} or ±{([2]) (4) 16 32 64 80 96 112 120 ([122])}.
*Option 2: if adjustment according to a pilot position is present, feedback tone indices may be ±{([2]) 16 32 46/50 64 80 96 112 ([122])} or ±{([2]) (4) 16 32 46/50 64 80 96 112 120 ([122])}.

(1)-G) 1×HE-LTF, Ng=16
When the 1×HE-LTF is used and Ng=16, may be divided into Case 1, Case 2, Case 3 and Case 4 and described.

-Case 1: In a 16-blank unit from ±4
*Option 1: if adjustment according to a pilot position is not present, feedback tone indices may be ±{4 20 36 52 68 84 100 120}.
*Option 2: if adjustment according to a pilot position is present, feedback tone indices may be ±{4 20 32/40 52 68 84 100 112/120 120}.

-Case 2: In a 16-blank unit from ±8
*Option 1: if adjustment according to a pilot position is not present, feedback tone indices may be ±{(4) 8 24 40 56 72 88 104 120}.
*Option 2: Adjustment is not necessary because there is no tone index overlapping a pilot tone in Option 1.

-Case 3: In a 16-blank unit from ±12
*Option 1: if adjustment according to a pilot position is not present, feedback tone indices may be ±{(4) 12 28 44 60 76 92 108 120}.
*Option 2: if adjustment according to a pilot position is present, feedback tone indices may be ±{(4) 12 28 44 60 72/80 92 108 120}.

-Case 4: In a 16-blank unit from ±16
*Option 1: if adjustment according to a pilot position is not present, feedback tone indices may be ±{(4) 16 32 64 80 96 112 120}.
*Option 2: if adjustment according to a pilot position is present, feedback tone indices may be ±{(4) 16 32 44/52 64 80 96 112 120}.

Example (2)—40 MHz

A method of configuring feedback tone indices (or feedback subcarrier indices) for transmission in the 40 MHz band is described.

Figure 14:
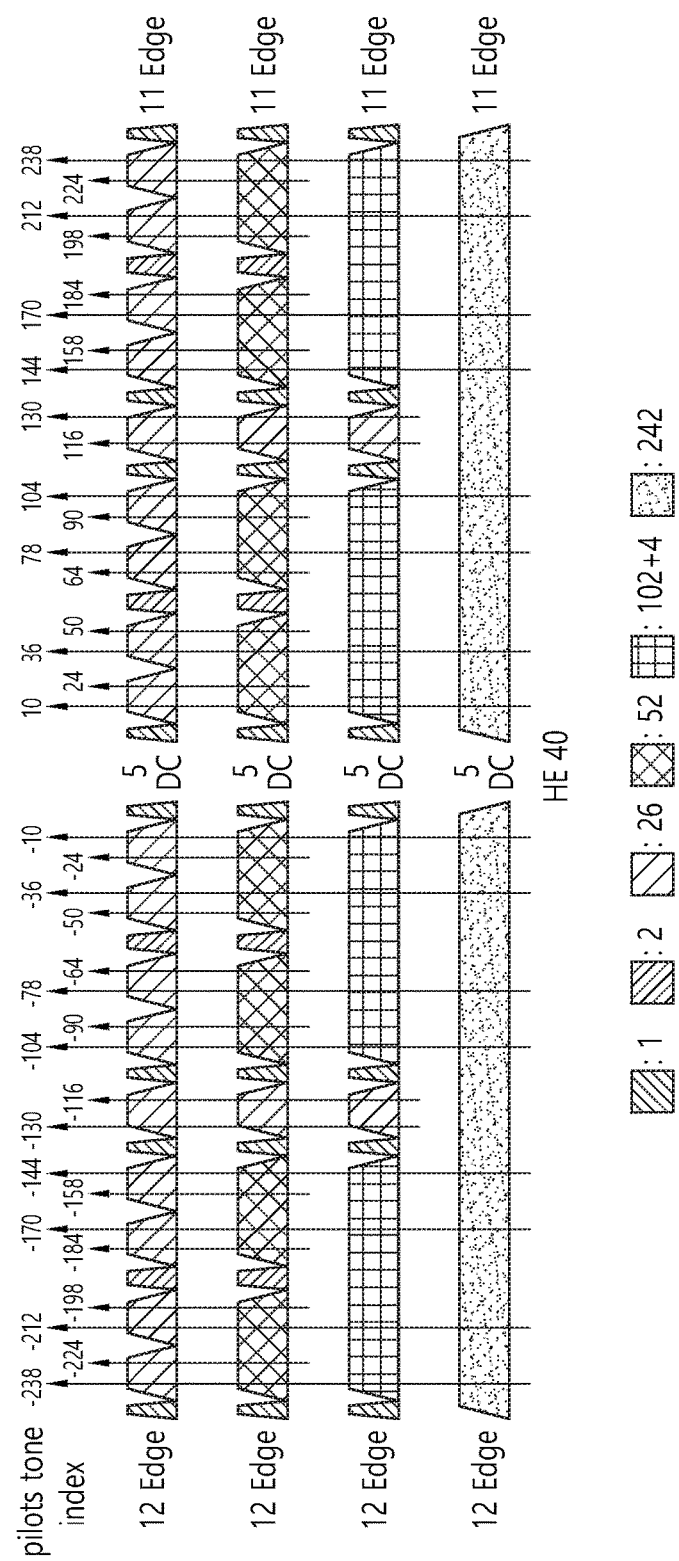
FIG. 14 is a diagram showing a pilot subcarrier index used on a 40 MHz band in a resource unit (RU) according to the present embodiment.

FIG. 14 is a diagram showing pilot subcarrier indices in a resource unit (RU) used in the 40 MHz band according to the present embodiment.

Referring to FIG. 14, if a 26-RU and/or a 52-RU is used in the 40 MHz band, pilot subcarrier indices may be ±{10, 24, 36, 50, 64, 78, 90, 104, 116, 130, 144, 158, 170, 184, 198, 212, 224, 238}. If a 106-RU and/or 242-RU and/or a 484-RU (full band) is used in the 40 MHz band, pilot subcarrier indices may be ±{10, 36, 78, 104, 144, 170, 212, 238}.

(2)-A) 2×HE-LTF, Ng=2

When the 2×HE-LTF is used and Ng=2, feedback tone indices may be ±{4 6 8 12 14 16 18 20 22 24 26 28 30 32 34 38 40 42 44 46 48 50 52 54 [56] 58 60 62 64 66 68 70 72 74 76 80 82 84 86 88 90 92 94 96 98 100 102 106 108 [110] 112 114 116 118 120 122 124 126 128 130 132 134 136 138 140 142 146 148 150 152 154 156 158 160 162 164 166 168 172 174 176 178 180 182 184 186 188 [190] 192 194 196 198 200 202 204 206 208 210 214 216 218 220 222 224 226 228 230 232 234 236 240 242 [244]}.

In this case, the underlined tone index a is not fed back because it corresponds to a pilot tone index in the 26-RU or 52-RU. In this case, the underlined tone index a may be fed back because it does not correspond to a pilot tone index in the 106-RU, the 242-RU or the 484-RU (full band). This is applied to the following embodiment in the same manner.

(2)-B) 2×HE-LTF, Ng=4

When the 2×HE-LTF is used and Ng=4, Case 1 and Case 2 may be divided and described.

-Case 1: In a 4-blank unit from ±4
*Option 1: if adjustment according to a pilot position is not present, feedback tone indices may be ±{4 8 12 16 20 24 28 32 36 40 44 48 52 [56] 60 64 68 72 76 80 84 88 92 96 100 104 108 112 116 120 124 128 132 136 140 144 148 152 156 160 164 168 172 176 180 184 188 192 196 200 204 208 212 216 220 224 228 232 236 240 [244]} or ±{4 8 12 16 20 24 28 32 40 44 48 52 54 [56] 58 60 64 68 72 76 80 84 88 92 96 100 108 112 116 120 124 128 132 136 140 148 152 156 160 164 168 172 176 180 184 188 192 196 200 204 208 216 220 224 228 232 236 240 242 [244]}.
*Option 2: if adjustment according to a pilot position is present, feedback tone indices may be ±{4 8 12 16 20 22/26 28 32 34/38 40 44 48 52 [56] 60 62/66 68 72 76 80 84 88 92 96 100 102/106 108 112 114/118 120 124 128 132 136 140 142/146 148 152 156 160 164 168 172 176 180 182/186 188 192 196 200 204 208 210/214 216 220 222/226 228 232 236 240 [244]} or ±{4 8 12 16 20 22/26 28 32 34/38 40 44 48 52 54 [56] 58 60 62/66 68 72 76 80 84 88 92 96 100 102/106 108 112 114/118 120 124 128 132 136 140 142/146 148 152 156 160 164 168 172 176 180 182/186 188 192 196 200 204 208 210/214 216 220 222/226 228 232 236 240 242 [244]}.

-Case 2: In a 4-blank unit from ±6
*Option 1: if adjustment according to a pilot position is not present, feedback tone indices may be ±{(4) 6 14 18 22 26 30 34 38 42 46 50 54 58 62 66 70 74 82 86 90 94 98 102 106 [110] 114 118 122 126 130 134 138 142 146 150 154 158 162 166 174 178 182 186 [190] 194 198 202 206 210 214 218 222 226 230 234 242 ([244])} or ±{(4) 6 14 18 22 26 30 34 38 42 46 50 54 58 62 66 70 74 82 86 90 94 98 102 106 108 [110] 112 114 118 122 126 130 134 138 142 146 150 154 158 162 166 174 178 182 186 188 [190] 192 194 198 202 206 210 214 218 222 226 230 234 242 ([244])}.
*Option 2: if adjustment according to a pilot position is present, feedback tone indices may be ±{(4) 6 8/12 14 18 22 26 30 34 38 42 46 48/52 54 58 62 66 70 74 76/80 82 86 88/92 94 98 102 106 [110] 114 118 122 126 128/132 134 138 142 146 150 154 156/160 162 166 168/172 174 178 182 186 [190] 194 196/200 202 206 210 214 218 222 226 230 234 236/240 242 ([244])} or ±{(4) 6 8/12 14 18 22 26 30 34 38 42 46 48/52 54 58 62 66 70 74 76/80 82 86 88/92 94 98 102 106 108 [110] 112 114 118 122 126 128/132 134 138 142 146 150 154 156/160 162 166 168/172 174 178 182 186 188 [190] 192 194 196/200 202 206 210 214 218 222 226 230 234 236/240 242 ([244])}.

(2)-C) 1×HE-LTF, Ng=4

When the 1×HE-LTF is used and Ng=4, feedback tone indices may be ±{4 8 12 16 20 24 28 32 40 44 48 52 [56] 60 64 68 72 76 80 84 88 92 96 100 108 112 116 120 124 128 132 136 140 148 152 156 160 164 168 172 176 180 184 188 192 196 200 204 208 216 220 224 228 232 236 240 [244]}.

(2)-D) 2×HE-LTF, Ng=8

When the 2×HE-LTF is used and Ng=8, may be divided into Case 1, Case 2, Case 3 and Case 4 and described.

-Case 1: In an 8-blank unit from ±4
*Option 1: if adjustment according to a pilot position is not present, feedback tone indices may be ±{4 12 20 28 44 52 60 68 76 84 92 100 108 116 124 132 140 148 156 164 172 180 188 196 204 220 228 236 [244]} or ±{4 12 20 28 44 52 60 68 76 84 92 100 108 116 124 132 140 148 156 164 172 180 196 204 220 228 236 242 [244]}.
*Option 2: if adjustment according to a pilot position is present, feedback tone indices may be ±{4 12 20 28 34/38 44 52 60 68 76 84 92 100 108 114/118 124 132 140 148 156 164 172 180 188 196 204 210/214 220 228 236 [244]} or ±{4 12 20 28 34/38 44 52 60 68 76 84 92 100 108 114/118 124 132 140 148 156 164 172 180 188 196 204 210/214 220 228 236 242 [244]}.

-Case 2: In an 8-blank unit from ±6
*Option 1: if adjustment according to a pilot position is not present, feedback tone indices may be ±{(4) 6 14 22 30 38 46 54 62 70 86 94 102 [110] 118 126 134 142 150 158 166 174 182 [190] 198 206 214 222 230 ([244])} or ±{(4) 6 14 22 30 38 46 54 62 70 86 94 102 108 [110] 112 118 126 134 142 150 158 166 174 182 188 [190] 192 198 206 214 222 230 (242) ([244])}.
*Option 2: if adjustment according to a pilot position is present, feedback tone indices may be ±{(4) 6 14 22 30 38 46 54 62 70 76/80 86 94 102 [110] 118 126 134 142 150 156/160 166 174 182 [190] 196/200 206 214 222 230 236/240 ([244])} or ±{(4) 6 14 22 30 38 46 54 62 70 76/80 86 94 102 108 [110] 112 118 126 134 142 150 156/160 166 174 182 188 [190] 192 196/200 206 214 222 230 236/240 (242) ([244])}.

-Case 3: In an 8-blank unit from ±8
*Option 1: if adjustment according to a pilot position is not present, feedback tone indices may be ±{(4) 8 16 24 32 40 48 [56] 64 72 80 88 96 112 120 128 136 152 160 168 176 184 192 200 208 216 224 232 240 ([244])} or ±{(4) 8 16 24

32 40 48 54 [56] 58 64 72 80 88 96 112 120 128 136 152 160 168 176 184 192 200 208 216 224 232 240 (242) ([244])}.

*Option 2: if adjustment according to a pilot position is present, feedback tone indices may be ±{(4) 8 16 22/26 32 40 48 [56] 62/66 72 80 88 96 102/106 112 120 128 136 142/146 152 160 168 176 182/186 192 200 208 216 222/226 232 240 ([244])} or ±{(4) 8 16 22/26 32 40 48 54 [56] 58 62/66 72 80 88 96 102/106 112 120 128 136 142/146 152 160 168 176 182/186 192 200 208 216 222/226 232 240 (242) ([244])}.

-Case 4: In an 8-blank unit from ±10

*Option 1: if adjustment according to a pilot position is not present, feedback tone indices may be ±{(4) 18 26 34 42 50 58 66 74 82 90 98 106 114 122 130 138 146 154 162 178 186 194 202 210 218 226 234 242 ([244])}.

*Option 2: if adjustment according to a pilot position is present, feedback tone indices may be ±{(4) 8/12 18 26 34 42 48/52 58 66 74 82 88/92 98 106 114 122 128/132 138 146 154 162 168/172 178 186 194 202 210 218 226 234 242 ([244])}.

(2)-E) 1×HE-LTF, Ng=8

When the 1×HE-LTF is used and Ng=8, Case 1 and Case 2 may be divided and described.

-Case 1: In an 8-blank unit from ±4

*Option 1: if adjustment according to a pilot position is not present, feedback tone indices may be ±{4 12 20 28 44 52 60 68 76 84 92 100 108 116 124 132 140 148 156 164 172 180 188 196 204 220 228 236 [244]} or ±{4 12 20 28 44 52 60 68 76 84 92 100 108 116 124 132 140 148 156 164 172 180 188 196 204 220 228 236 240 [244]}.

*Option 2: if adjustment according to a pilot position is present, feedback tone indices may be ±{4 12 20 28 32/40 44 52 60 68 76 84 92 100 108 112/120 124 132 140 148 156 164 172 180 188 196 204 208/216 220 228 236 [244]} or ±{4 12 20 28 32/40 44 52 60 68 76 84 92 100 108 112/120 124 132 140 148 156 164 172 180 188 196 204 208/216 220 228 236 240 [244]}.

-Case 2: In an 8-blank unit from ±8

*Option 1: if adjustment according to a pilot position is not present, feedback tone indices may be ±{(4) 8 16 24 32 40 48 [56] 64 72 80 88 96 112 120 128 136 152 160 168 176 184 192 200 208 216 224 232 240 ([24])} or ±{(4) 8 16 24 32 40 48 52 [56] 60 64 72 80 88 96 112 120 128 136 152 160 168 176 184 192 200 208 216 224 232 240 ([244])}.

*Option 2: if adjustment according to a pilot position is present, feedback tone indices may be ±{(4) 8 16 20/28 32 40 48 [56] 60/68 72 80 88 96 100/108 112 120 128 136 140/148 152 160 168 176 180/188 192 200 208 216 220/228 232 240 ([244])} or ±{(4) 8 16 20/28 32 40 48 52 [56] 60 68 72 80 88 96 100/108 112 120 128 136 140/148 152 160 168 176 180/188 192 200 208 216 220/228 232 240 ([244])}.

(2)-F) 2×HE-LTF, Ng=16

When the 2×HE-LTF is used and Ng=16, Case 1, Case 2, Case 3, Case 4, Case 5, Case 6, Case 7 and Case 8 may be divided and described.

-Case 1: In a 16-blank unit from ±4

*Option 1: if adjustment according to a pilot position is not present, feedback tone indices may be ±{4 20 36 52 68 84 100 116 132 148 164 180 196 228 [244]} or ±{4 20 52 68 84 100 116 132 148 164 180 196 212 228 242 [244]}.

*Option 2: if adjustment according to a pilot position is present, feedback tone indices may be ±{4 20 34/38 52 68 84 100 114/118 132 148 164 180 196 210/214 228 [244]} or ±{4 20 34/38 52 68 84 100 114/118 132 148 164 180 196 210/214 228 242 [244]}.

-Case 2: In a 16-blank unit from ±6

*Option 1: if adjustment according to a pilot position is not present, feedback tone indices may be ±{(4) 6 22 38 54 70 86 102 118 134 150 166 182 198 214 230 ([244])} or ±{(4) 6 22 38 54 70 86 102 118 134 150 166 182 198 214 230 (242) ([244])}.

*Option 2: if adjustment according to a pilot position is present, feedback tone indices may be ±{(4) 6 22 38 54 70 86 102 118 134 150 166 182 196/200 214 230 ([244])} or ±{(4) 6 22 38 54 70 86 102 118 134 150 166 182 196/200 214 230 (242) ([244])}.

-Case 3: In a 16-blank unit from ±8

*Option 1: if adjustment according to a pilot position is not present, feedback tone indices may be ±{(4) 8 24 40 [56] 72 88 120 136 152 168 184 200 216 232 ([244])} or ±{(4) 8 24 40 54 [56] 58 72 88 120 136 152 168 184 200 216 232 (242) ([244])}.

*Option 2: if adjustment according to a pilot position is present, feedback tone indices may be ±{(4) 8 22/26 40 [56] 72 88 102/106 120 136 152 168 182/186 200 216 232 ([244])} or ±{(4) 8 22/26 40 54 [56] 58 72 88 102/106 120 136 152 168 182/186 200 216 232 (242) ([244])}.

-Case 4: In a 16-blank unit from ±10

*Option 1: if adjustment according to a pilot position is not present, feedback tone indices may be ±{(4) 26 42 58 74 90 106 122 138 154 186 202 218 234 ([244])} or ±{(4) 26 42 58 74 90 106 122 138 154 186 202 218 234 (242) ([244])}.

*Option 2: if adjustment according to a pilot position is present, feedback tone indices may be ±{(4) 8/12 26 42 58 74 88/92 106 122 138 154 168/172 186 202 218 234 ([244])} or ±{(4) 8/12 26 42 58 74 88/92 106 122 138 154 168/172 186 202 218 234 (242) ([244])}.

-Case 5: In a 16-blank unit from ±12

*Option 1: if adjustment according to a pilot position is not present, feedback tone indices may be ±{(4) 12 28 44 60 76 92 108 124 140 156 172 188 204 220 236 ([244])} or ±{(4) 12 28 44 60 76 92 108 124 140 156 172 188 204 220 236 (242) ([244])}.

*Option 2: Adjustment is not necessary because there is no tone index overlapping a pilot tone in Option 1.

-Case 6: In a 16-blank unit from ±14

*Option 1: if adjustment according to a pilot position is not present, feedback tone indices may be ±{(4) 14 30 46 62 94 [110] 126 142 158 174 [190] 206 222 ([244])} or ±{(4) 14 30 46 62 94 108 [110] 112 126 142 158 174 188 [190] 192 206 222 (242) ([244])}.

*Option 2: if adjustment according to a pilot position is present, feedback tone indices may be ±{(4) 14 30 46 62 76/80 94 [110] 126 142 156/160 174 [190] 206 222 236/240 ([244])} or ±{(4) 14 30 46 62 76/80 94 108 [110] 112 126 142 156/160 174 188 [190] 192 206 222 236/240 (242) ([244])}.

-Case 7: In a 16-blank unit from ±16

*Option 1: if adjustment according to a pilot position is not present, feedback tone indices may be ±{(4) 16 32 48 64 80 96 112 128 160 176 192 208 224 240 ([244])} or ±{(4) 16 32 48 64 80 96 112 128 160 176 192 208 224 240 (242) ([244])}.

*Option 2: if adjustment according to a pilot position is present, feedback tone indices may be ±{(4) 16 32 48 62/66 80 96 112 128 142/146 160 176 192 208 222/226 240 ([244])} or ±{(4) 16 32 48 62/66 80 96 112 128 142/146 160 176 192 208 222/226 240 (242) ([244])}.

-Case 8: In a 16-blank unit from ±18

*Option 1: if adjustment according to a pilot position is not present, feedback tone indices may be ±{(4) 18 34 50 66 82 98 114 130 146 162 178 194 210 226 242 ([244])}.

*Option 2: if adjustment according to a pilot position is present, feedback tone indices may be ±{(4) 18 34 48/52 66 82 98 114 128/132 146 162 178 194 210 226 242 ([244])}.

(2)-G) 1×HE-LTF, Ng=16

When the 1×HE-LTF is used and Ng=16, may be divided into Case 1, Case 2, Case 3 and Case 4 and described.

-Case 1: In a 16-blank unit from ±4

*Option 1: if adjustment according to a pilot position is not present, feedback tone indices may be ±{4 20 52 68 84 100 116 132 148 164 180 196 228 [244]} or ±{4 20 52 68 84 100 116 132 148 164 180 196 228 240 [244]}.

*Option 2: if adjustment according to a pilot position is present, feedback tone indices may be ±{4 20 32/40 52 68 84 100 112/120 132 148 164 180 196 208/216 228 [244]} or ±{4 20 32/40 52 68 84 100 112/120 132 148 164 180 196 208/216 228 240 [244]}.

-Case 2: In a 16-blank unit from ±8

*Option 1: if adjustment according to a pilot position is not present, feedback tone indices may be ±{(4) 8 24 40 [56] 72 88 120 136 152 168 184 200 216 232 ([244])} or ±{(4) 8 24 40 52 [56] 60 72 88 120 136 152 168 184 200 216 232 240 ([244])}.

*Option 2: if adjustment according to a pilot position is present, feedback tone indices may be ±{(4) 8 20/28 40 [56] 72 88 100/108 120 136 152 168 180/188 200 216 232 ([244])} or ±{(4) 8 20/28 40 52 [56] 60 72 88 100/108 120 136 152 168 180/188 200 216 232 240 ([244])}.

-Case 3: In a 16-blank unit from ±12

*Option 1: if adjustment according to a pilot position is not present, feedback tone indices may be ±{(4) 12 28 44 60 76 92 108 124 140 156 172 188 204 220 236 ([244])} or ±{(4) 12 28 44 60 76 92 108 124 140 156 172 188 204 220 236 240 ([244])}.

*Option 2: Adjustment is not necessary because there is no tone index overlapping a pilot tone in Option 1.

-Case 4: In a 16-blank unit from ±16

*Option 1: if adjustment according to a pilot position is not present, feedback tone indices may be ±{(4) 16 32 48 64 80 96 112 128 160 176 192 208 224 240 ([244])}.

*Option 2: if adjustment according to a pilot position is present, feedback tone indices may be ±{(4) 16 32 48 60/68 80 96 112 128 140/148 160 176 192 208 220/228 240 ([244])}.

Example (3)—80 MHz

A method of configuring feedback tone indices (or feedback subcarrier indices) for transmission in the 80 MHz band is described below.

Figure 15:
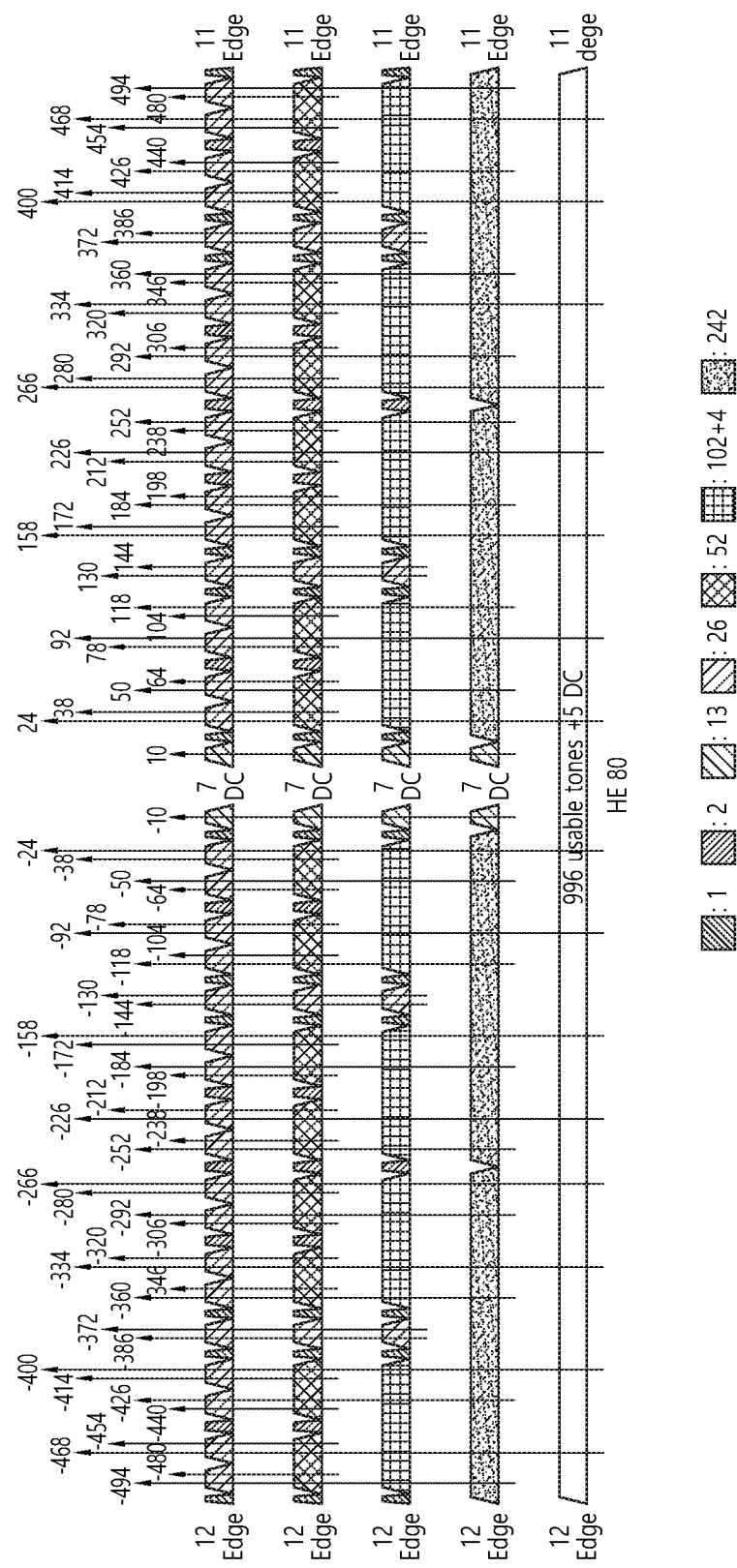
FIG. 15 is a diagram showing a pilot subcarrier index used on an 80 MHz band in a resource unit (RU) according to the present embodiment.

FIG. 15 is a diagram showing pilot subcarrier indices in a resource unit (RU) used in the 80 MHz band according to the present embodiment.

Referring to FIG. 15, if a 26-RU and/or a 52-RU is used in the 80 MHz band, pilot subcarrier indices may be ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}. If a 106-RU and/or a 242-RU and/or a 484-RU (full band) is used in the 80 MHz band, pilot subcarrier indices may be ±{24, 50, 92, 118, 158, 184, 226, 252, 266, 292, 334, 360, 400, 426, 468, 494}. If a 996-RU (full band) is used in the 80 MHz band, pilot subcarrier indices may be ±{24, 92, 158, 226, 266, 334, 400, 468}.

(3)-A) 2×HE-LTF, Ng=2

When the 2×HE-LTF is used and Ng=2, feedback tone indices may be ±{4 6 8 10 12 14 16 18 20 22 26 28 30 32 34 36 38 40 42 44 46 48 50 52 54 56 58 60 62 64 66 68 [70] 72 74 76 78 80 82 84 86 88 90 94 96 98 100 102 104 106 108 110 112 114 116 118 120 122 [124] 126 128 130 132 134 136 138 140 142 144 146 148 150 152 154 156 160 162 164 166 168 170 172 174 176 178 180 182 184 186 188 190 192 194 196 198 200 202 [204] 206 208 210 212 214 216 218 220 222 224 228 230 232 234 236 238 240 242 244 246 248 250 252 254 256 [258] 260 262 264 268 270 272 274 276 278 280 282 284 286 288 290 292 294 296 298 300 302 304 306 308 310 [312] 314 316 318 320 322 324 326 328 330 332 336 338 340 342 344 346 348 350 352 354 356 358 360 362 364 [366] 368 370 372 374 376 378 380 382 384 386 388 390 392 394 396 398 402 404 406 408 410 412 414 416 418 420 422 424 426 428 430 432 434 436 438 440 442 444 [446] 448 450 452 454 456 458 460 462 464 466 470 472 474 476 478 480 482 484 486 488 490 492 494 496 498 [500]}.

In this case, the underlined tone index a is not fed back because it corresponds to a pilot tone index in the 26-RU or the 52-RU. In this case, the underlined tone index a may be fed back because it does not correspond to a pilot tone index in the 106-RU, 242-RU, 484-RU or 996-RU (full band). This is applied to the following embodiment in the same manner.

Furthermore, the slanted tone index a is not fed back because it corresponds to a pilot tone index in the 26-RU, 52-RU, 106-RU, 242-RU or 484-RU. This is applied to the following embodiment in the same manner.

(3)-B) 2×HE-LTF, Ng=4

When the 2×HE-LTF is used and Ng=4, Case 1 and Case 2 may be divided and described.

-Case 1: In a 4-blank unit from ±4

*Option 1: if adjustment according to a pilot position is not present, feedback tone indices may be ±{4 8 12 16 20 24 28 32 36 40 44 48 52 56 60 64 68 72 76 80 84 88 92 96 100 104 108 112 116 120 [124] 128 132 136 140 144 148 152 156 160 164 168 172 176 180 184 188 192 196 200 [204] 208 212 216 220 224 228 232 236 240 244 248 252 256 260 264 268 272 276 280 284 288 292 296 300 304 308 [312] 316 320 324 328 332 336 340 344 348 352 356 360 364 368 372 376 380 384 388 392 396 400 404 408 412 416 420 424 428 432 436 440 444 448 452 456 460 464 468 472 476 480 484 488 492 496 [500]} or ±{4 8 12 16 20 28 32 36 40 44 48 52 56 60 64 68 72 76 80 84 88 96 100 104 108 112 116 120 122 [124] 126 128 132 136 140 144 148 152 156 160 164 168 172 176 180 184 188 192 196 200 202 [204] 206 208 212 216 220 224 228 232 236 240 244 248 252 256 260 264 268 272 276 280 284 288 292 296 300 304 308 310 [312] 314 316 320 324 328 332 336 340 344 348 352 356 360 364 368 372 376 380 384 388 392 396 404 408 412 416 420 424 428 432 436 440 444 448 452 456 460 464 472 476 480 484 488 492 496 498 [500]}.

*Option 2: if adjustment according to a pilot position is present, feedback tone indices may be ±{4 8 12 16 20 22/26 28 32 36 40 44 48 52 56 60 62/66 68 72 76 80 84 88 90/94 96 100 102/106 108 112 116 120 [124] 128 132 136 140 142/146 148 152 156 160 164 168 170/174 176 180 182/186 188 192 196 200 [204] 208 210/214 216 220 224 228 232 236 240 244 248 250/254 256 260 264 268 272 276 278/282 284 288 290/294 296 300 304 308 [312] 316 318/322 324 328 332 336 340 344 348 352 356 358/362 364 368 370/374 376 380 384 388 392 396 398/402 404 408 412 416 420 424 428 432 436 438/442 444 448 452 456 460 464 466/470 472 476 478/482 484 488 492 496 [500]} or ±{4 8 12 16 20 22/26 28 32 36 40 44 48 52 56 60 62/66 68 72 76 80 84 88 90/94 96 100 102/106 108 112 116 120 122 [124] 126 128 132 136 140 142/146 148 152 156 160 164 168 170/174 176 180 182/186 188 192 196 200 202 [204] 206 208 210/214

216 220 224 228 232 236 240 244 248 250/254 256 260 264 268 272 276 278/282 284 288 290/294 296 300 304 308 310 [312] 314 316 318/322 324 328 332 336 340 344 348 352 356 358/362 364 368 370/374 376 380 384 388 392 396 398/402 404 408 412 416 420 424 428 432 436 438/442 444 448 452 456 460 464 466/470 472 476 478/482 484 488 492 496 498 [500]}.

-Case 2: In a 4-blank unit from ±6

*Option 1: if adjustment according to a pilot position is not present, feedback tone indices may be ±{(4) 6 10 14 18 22 26 30 34 38 42 46 50 54 58 62 66 [70] 74 78 82 86 90 94 98 102 106 110 114 118 122 126 130 134 138 142 146 150 154 162 166 170 174 178 182 186 190 194 198 202 206 210 214 218 222 230 234 238 242 246 250 254 [258] 262 270 274 278 282 286 290 294 298 302 306 310 314 318 322 326 330 338 342 346 350 354 358 362 [366] 370 374 378 382 386 390 394 398 402 406 410 414 418 422 426 430 434 438 442 [446] 450 454 458 462 466 470 474 478 482 486 490 494 498 ([500])} or ±{(4) 6 10 14 18 22 26 30 34 38 42 46 50 54 58 62 66 68 [70] 72 74 78 82 86 90 94 98 102 106 110 114 118 122 126 130 134 138 142 146 150 154 162 166 170 174 178 182 186 190 194 198 202 206 210 214 218 222 230 234 238 242 246 250 254 256 [258] 260 262 270 274 278 282 286 290 294 298 302 306 310 314 318 322 326 330 338 342 346 350 354 358 362 364 [366] 368 370 374 378 382 386 390 394 398 402 406 410 414 418 422 426 430 434 438 442 444 [446] 448 450 454 458 462 466 470 474 478 482 486 490 494 498 ([500])}.

*Option 2: if adjustment according to a pilot position is present, feedback tone indices may be ±{(4) 6 8/12 14 18 22 26 30 34 36/40 42 46 48/52 54 58 62 66 [70] 74 76/80 82 86 90 94 98 102 106 110 114 116/120 122 126 128/132 134 138 142 146 150 154 156/160 162 166 170 174 178 182 186 190 194 196/200 202 206 210 214 218 222 224/228 230 234 236/240 242 246 250 254 [258] 262 264/268 270 274 278 282 286 290 294 298 302 304/308 310 314 318 322 326 330 332/336 338 342 344/348 350 354 358 362 [366] 370 374 378 382 384/388 390 394 398 402 406 410 412/416 418 422 424/428 430 434 438 442 [446] 450 452/456 458 462 466 470 474 478 482 486 490 492/496 498 ([500])} or ±{(4) 6 8/12 14 18 22 26 30 34 36/40 42 46 48/52 54 58 62 66 68 [70] 72 74 76/80 82 86 90 94 98 102 106 110 114 116/120 122 126 128/132 134 138 142 146 150 154 156/160 162 166 170 174 178 182 186 190 194 196/200 202 206 210 214 218 222 224/228 230 234 236/240 242 246 250 254 256 [258] 260 262 264/268 270 274 278 282 286 290 294 298 302 304/308 310 314 318 322 326 330 332/336 338 342 344/348 350 354 358 362 364 [366] 368 370 374 378 382 384/388 390 394 398 402 406 410 412/416 418 422 424/428 430 434 438 442 444 [446] 448 450 452/456 458 462 466 470 474 478 482 486 490 492/496 498 ([500])}.

(3)-C) 1×HE-LTF, Ng=4

When the 1×HE-LTF is used and Ng=4, feedback tone indices may be ±{4 8 12 16 20 28 32 36 40 44 48 52 56 60 64 68 72 76 80 84 88 96 100 104 108 112 116 120 [124] 128 132 136 140 144 148 152 156 160 164 168 172 176 180 184 188 192 196 200 [204] 208 212 216 220 224 228 232 236 240 244 248 252 256 260 264 268 272 276 280 284 288 292 296 300 304 308 [312] 316 320 324 328 332 336 340 344 348 352 356 360 364 368 372 376 380 384 388 392 396 404 408 412 416 420 424 428 432 436 440 444 448 452 456 460 464 472 476 480 484 488 492 496 [500]}.

(3)-D) 2×HE-LTF, Ng=8

When the 2×HE-LTF is used and Ng=8, Case 1, Case 2, Case 3 and Case 4 may be divided and described.

-Case 1: In an 8-blank unit from ±4

*Option 1: if adjustment according to a pilot position is not present, feedback tone indices may be ±{4 12 20 28 36 44 52 60 68 76 84 100 108 116 [124] 132 140 148 156 164 172 180 188 196 [204] 212 220 228 236 244 252 260 268 276 284 292 300 308 316 324 332 340 348 356 364 372 380 388 396 404 412 420 428 436 44 452 460 476 484 492 [500]} or ±{4 12 20 28 36 44 52 60 68 76 84 100 108 116 122 [124] 126 132 140 148 156 164 172 180 188 196 202 [204] 206 212 220 228 236 244 252 260 268 276 284 292 300 308 316 324 332 340 348 356 364 372 380 388 396 404 412 420 428 436 444 452 460 476 484 492 498 [500]}.

*Option 2: if adjustment according to a pilot position is present, feedback tone indices may be ±{4 12 20 28 36 44 52 60 68 76 84 90/94 100 108 116 [124] 132 140 148 156 164 170/174 180 188 196 [204] 210/214 220 228 236 244 250/254 260 268 276 284 290/294 300 308 316 324 332 340 348 356 364 370/374 380 388 396 404 412 420 428 436 444 452 460 466/470 476 484 492 [500]} or ±{4 12 20 28 36 44 52 60 68 76 84 90/94 100 108 116 122 [124] 126 132 140 148 156 164 170/174 180 188 196 202 [204] 206 210/214 220 228 236 244 250/254 260 268 276 284 290/294 300 308 316 324 332 340 348 356 364 370/374 380 388 396 404 412 420 428 436 444 452 460 466/470 476 484 492 498 [500]}.

-Case 2: In an 8-blank unit from ±6

*Option 1: if adjustment according to a pilot position is not present, feedback tone indices may be ±{(4) 6 14 22 30 38 46 54 62 [70] 78 86 94 102 110 118 126 134 142 150 166 174 182 190 198 206 214 222 230 238 246 254 262 270 278 286 294 302 310 318 326 342 350 358 [366] 374 382 390 398 406 414 422 430 438 [446] 454 462 470 478 486 494 ([500])} or ±{(4) 6 14 22 30 38 46 54 62 68 [70] 72 78 86 94 102 110 118 126 134 142 150 166 174 182 190 198 206 214 222 230 238 246 254 262 270 278 286 294 302 310 318 326 342 350 358 364 [366] 368 374 382 390 398 406 414 422 430 438 444 [446] 448 454 462 470 478 486 494 (498) ([500])}.

*Option 2: if adjustment according to a pilot position is present, feedback tone indices may be ±{(4) 6 14 22 30 36/40 46 54 62 [70] 76/80 86 94 102 110 116/120 126 134 142 150 156/160 166 174 182 190 196/200 206 214 222 230 236/240 246 254 262 270 278 286 294 302 310 318 326 332/336 342 350 358 [366] 374 382 390 398 406 412/416 422 430 438 [446] 452/456 462 470 478 486 492/496 ([500])} or ±{(4) 6 14 22 30 36/40 46 54 62 68 [70] 72 76/80 86 94 102 110 116/120 126 134 142 150 156/160 166 174 182 190 196/200 206 214 222 230 236/240 246 254 262 270 278 286 294 302 310 318 326 332/336 342 350 358 364 [366] 368 374 382 390 398 406 412/416 422 430 438 444 [446] 448 452/456 462 470 478 486 492/496 (498) ([500])}.

-Case 3: In an 8-blank unit from ±8

*Option 1: if adjustment according to a pilot position is not present, feedback tone indices may be ±{(4) 8 16 32 40 48 56 64 72 80 88 96 104 112 120 128 136 144 152 160 168 176 184 192 200 208 216 224 232 240 248 256 264 272 280 288 296 304 [312] 320 328 336 344 352 360 368 376 384 392 408 416 424 432 440 448 456 464 472 480 488 496 ([500])} or ±{(4) 8 16 32 40 48 56 64 72 80 88 96 104 112 120 128 136 144 152 160 168 176 184 192 200 208 216 224 232 240 248 256 264 272 280 288 296 304 310 [312] 314 320 328 336 344 352 360 368 376 384 392 408 416 424 432 440 448 456 464 472 480 488 496 (498) ([500])}.

*Option 2: if adjustment according to a pilot position is present, feedback tone indices may be ±{(4) 8 16 22/26 32 40 48 56 62/66 72 80 88 96 102/106 112 120 128 136 142/146 152 160 168 176 182/186 192 200 208 216 224 232 240 248 256 264 272 278/282 288 296 304 [312] 318/322 328 336 344 352 358/362 368 376 384 392 398/402 408 416

424 432 438/442 448 456 464 472 478/482 488 496 ([500])} or ±{(4) 8 16 22/26 32 40 48 56 62/66 72 80 88 96 102/106 112 120 128 136 142/146 152 160 168 176 182/186 192 200 208 216 224 232 240 248 256 264 272 278/282 288 296 304 310 [312] 314 318/322 328 336 344 352 358/362 368 376 384 392 398/402 408 416 424 432 438/442 448 456 464 472 478/482 488 496 (498) ([500])}.

-Case 4: In an 8-blank unit from ±10

*Option 1: if adjustment according to a pilot position is not present, feedback tone indices may be ±{(4) 10 18 26 34 42 50 58 66 74 82 90 98 106 114 122 130 138 146 154 162 170 178 186 194 202 210 218 234 242 250 [258] 274 282 290 298 306 314 322 330 338 346 354 362 370 378 386 394 402 410 418 426 434 442 450 458 466 474 482 490 498 ([500])} or ±{(4) 10 18 26 34 42 50 58 66 74 82 90 98 106 114 122 130 138 146 154 162 170 178 186 194 202 210 218 234 242 250 256 [258] 260 274 282 290 298 306 314 322 330 338 346 354 362 370 378 386 394 402 410 418 426 434 442 450 458 466 474 482 490 498 ([500])}.

*Option 2: if adjustment according to a pilot position is present, feedback tone indices may be ±{(4) 8/12 18 26 34 42 48/52 58 66 74 82 90 98 106 114 122 128/132 138 146 154 162 170 178 186 194 202 210 218 224/228 234 242 250 [258] 264/268 274 282 290 298 304/308 314 322 330 338 344/348 354 362 370 378 384/388 394 402 410 418 424/428 434 442 450 458 466 474 482 490 498 ([500])} or ±{(4) 8/12 18 26 34 42 48/52 58 66 74 82 90 98 106 114 122 128/132 138 146 154 162 170 178 186 194 202 210 218 224/228 234 242 250 256 [258] 260 264/268 274 282 290 298 304/308 314 322 330 338 344/348 354 362 370 378 384/388 394 402 410 418 424/428 434 442 450 458 466 474 482 490 498 ([500])}.

(3)-E) 1×HE-LTF, Ng=8

When the 1×HE-LTF is used and Ng=8, Case 1 and Case 2 may be divided and described.

-Case 1: In an 8-blank unit from ±4

*Option 1: if adjustment according to a pilot position is not present, feedback tone indices may be ±{4 12 20 28 36 44 52 60 68 76 84 100 108 116 [124] 132 140 148 156 164 172 180 188 196 [204] 212 220 228 236 244 252 260 268 276 284 292 300 308 316 324 332 340 348 356 364 372 380 388 396 404 412 420 428 436 444 452 460 476 484 492 [500]} or ±{4 12 20 28 36 44 52 60 68 76 84 100 108 116 120 [124] 128 132 140 148 156 164 172 180 188 196 200 [204] 208 212 220 228 236 244 252 260 268 276 284 292 300 308 316 324 332 340 348 356 364 372 380 388 396 404 412 420 428 436 444 452 460 476 484 492 496 [500]}

*Option 2: if adjustment according to a pilot position is present, feedback tone indices may be ±{4 12 20 28 36 44 52 60 68 76 84 88/96 100 108 116 [124] 132 140 148 156 164 168/176 180 188 196 [204] 208/216 220 228 236 244 248/256 260 268 276 284 288/296 300 308 316 324 332 340 348 356 364 368/376 380 388 396 404 412 420 428 436 444 452 460 464/472 476 484 492 [500]} or ±{4 12 20 28 36 44 52 60 68 76 84 88/96 100 108 116 120 [124] 128 132 140 148 156 164 168/176 180 188 196 200 [204] 208 216 220 228 236 244 248/256 260 268 276 284 288/296 300 308 316 324 332 340 348 356 364 368/376 380 388 396 404 412 420 428 436 444 452 460 464/472 476 484 492 496 [500]}.

-Case 2: In an 8-blank unit from ±8

*Option 1: if adjustment according to a pilot position is not present, feedback tone indices may be ±{(4) 8 16 32 40 48 56 64 72 80 88 96 104 112 120 128 136 144 152 160 168 176 184 192 200 208 216 224 232 240 248 256 264 272 280 288 296 304 [312] 320 328 336 344 352 360 368 376 384 392 408 416 424 432 440 448 456 464 472 480 488 496 ([500])} or ±{(4) 8 16 32 40 48 56 64 72 80 88 96 104 112 120 128 136 144 152 160 168 176 184 192 200 208 216 224 232 240 248 256 264 272 280 288 296 304 308 [312] 316 320 328 336 344 352 360 368 376 384 392 408 416 424 432 440 448 456 464 472 480 488 496 ([500])}.

*Option 2: if adjustment according to a pilot position is present, feedback tone indices may be ±{(4) 8 16 20/28 32 40 48 56 60/68 72 80 88 96 100/108 112 120 128 136 140/148 152 160 168 176 180/188 192 200 208 216 224 232 240 248 256 264 272 276/284 288 296 304 [312] 316/324 328 336 344 352 356/364 368 376 384 392 396/404 408 416 424 432 436/444 448 456 464 472 476/484 488 496 ([500])} ±{(4) 8 16 20/28 32 40 48 56 60/68 72 80 88 96 100/108 112 120 128 136 140/148 152 160 168 176 180/188 192 200 208 216 224 232 240 248 256 264 272 276/284 288 296 304 308 [312] 316 324 328 336 344 352 356/364 368 376 384 392 396/404 408 416 424 432 436/444 448 456 464 472 476/484 488 496 ([500])}.

(3)-F) 2×HE-LTF, Ng=16

When the 2×HE-LTF is used and Ng=16, Case 1, Case 2, Case 3, Case 4, Case 5, Case 6, Case 7 and Case 8 may be divided and described.

-Case 1: In a 16-blank unit from ±4

*Option 1: if adjustment according to a pilot position is not present, feedback tone indices may be ±{4 20 36 52 68 84 100 116 132 148 164 180 196 212 228 244 260 276 292 308 324 340 356 372 388 404 420 436 452 484 [500]} or ±{4 20 36 52 68 84 100 116 132 148 164 180 196 212 228 244 260 276 292 308 324 340 356 372 388 404 420 436 452 468 484 498 [500]}.

*Option 2: if adjustment according to a pilot position is present, feedback tone indices may be ±{4 20 36 52 68 84 100 116 132 148 164 180 196 210/214 228 244 260 276 290/294 308 324 340 356 370/374 388 404 420 436 452 466/470 484 [500]} or ±{4 20 36 52 68 84 100 116 132 148 164 180 196 210/214 228 244 260 276 290/294 308 324 340 356 370/374 388 404 420 436 452 466/470 484 498 [500]}.

-Case 2: In a 16-blank unit from ±6

*Option 1: if adjustment according to a pilot position is not present, feedback tone indices may be ±{(4) 6 22 38 54 [70] 86 102 118 134 150 166 182 198 214 230 246 262 278 294 310 326 342 358 374 390 406 422 438 454 470 486 ([500])} or ±{(4) 6 22 38 54 68 [70] 72 86 102 118 134 150 166 182 198 214 230 246 262 278 294 310 326 342 358 374 390 406 422 438 454 470 486 (498) ([500])}.

*Option 2: if adjustment according to a pilot position is present, feedback tone indices may be ±{(4) 6 22 36/40 54 [70] 86 102 116/120 134 150 166 182 196/200 214 230 246 262 278 294 310 326 342 358 374 390 406 422 438 452/456 470 486 ([500])} or ±{(4) 6 22 36/40 54 68 [70] 72 86 102 116/120 134 150 166 182 196/200 214 230 246 262 278 294 310 326 342 358 374 390 406 422 438 452/456 470 486 (498) ([500])}.

-Case 3: In a 16-blank unit from ±8

*Option 1: if adjustment according to a pilot position is not present, feedback tone indices may be ±{(4) 8 40 56 72 88 104 120 136 152 168 184 200 216 232 248 264 280 296 [312] 328 344 360 376 392 408 424 440 456 472 488 ([500])} or ±{(4) 8 40 56 72 88 104 120 136 152 168 184 200 216 232 248 264 280 296 310 [312] 314 328 344 360 376 392 408 424 440 456 472 488 (498) ([500])}.

*Option 2: if adjustment according to a pilot position is present, feedback tone indices may be ±{(4) 8 22/26 40 56 72 88 102/106 120 136 152 168 182/186 200 216 232 248 264 278/282 296 [312] 328 344 358/362 376 392 408 424 438/442 456 472 488 ([500])} or ±{(4) 8 22/26 40 56 72 88 102/106 120 136 152 168 182/186 200 216 232 248 264

278/282 296 310 [312] 314 328 344 358/362 376 392 408 424 438/442 456 472 488 (498) ([500])}.

-Case 4: In a 16-blank unit from ±10

*Option 1: if adjustment according to a pilot position is not present, feedback tone indices may be ±{(4) 10 26 42 58 74 90 106 122 138 154 170 186 202 218 234 250 282 298 314 330 346 362 378 394 410 426 442 458 474 490 ([500])} or ±{(4) 10 26 42 58 74 90 106 122 138 154 170 186 202 218 234 250 282 298 314 330 346 362 378 394 410 426 442 458 474 490 (498) ([500])}.

*Option 2: if adjustment according to a pilot position is present, feedback tone indices may be ±{(4) 8/12 26 42 58 74 90 106 122 138 154 170 186 202 218 234 250 264/268 282 298 314 330 344/348 362 378 394 410 424/428 442 458 474 490 ([500])} or ±{(4) 8/12 26 42 58 74 90 106 122 138 154 170 186 202 218 234 250 264/268 282 298 314 330 344/348 362 378 394 410 424/428 442 458 474 490 (498) ([500])}.

-Case 5: In a 16-blank unit from ±12

*Option 1: if adjustment according to a pilot position is not present, feedback tone indices may be ±{(4) 12 28 44 60 76 108 [124] 140 156 172 188 [204] 220 236 252 268 284 300 316 332 348 364 380 396 412 428 444 460 476 492 ([500])} or ±{(4) 12 28 44 60 76 108 122 [124] 126 140 156 172 188 202 [204] 206 220 236 252 268 284 300 316 332 348 364 380 396 412 428 444 460 476 492 (498) ([500])}.

*Option 2: if adjustment according to a pilot position is present, feedback tone indices may be ±{(4) 12 28 44 60 76 90/94 108 [124] 140 156 170/174 188 [204] 220 236 250/254 268 284 300 316 332 348 364 380 396 412 428 444 460 476 492 ([500])} or ±{(4) 12 28 44 60 76 90/94 108 122 [124] 126 140 156 170/174 188 202 [204] 206 220 236 250/254 268 284 300 316 332 348 364 380 396 412 428 444 460 476 492 (498) ([500])}.

-Case 6: In a 16-blank unit from ±14

*Option 1: if adjustment according to a pilot position is not present, feedback tone indices may be ±{(4) 14 30 46 62 78 94 110 126 142 174 190 206 222 238 254 270 286 302 318 350 [366] 382 398 414 430 [446] 462 478 494 ([500])} or ±{(4) 14 30 46 62 78 94 110 126 142 174 190 206 222 238 254 270 286 302 318 350 364 [366] 368 382 398 414 430 444 448 462 478 494 (498) ([500])}.

*Option 2: if adjustment according to a pilot position is present, feedback tone indices may be ±{(4) 14 30 46 62 76/80 94 110 126 142 156/160 174 190 206 222 236/240 254 270 286 302 318 332/336 350 [366] 382 398 412/416 430 [446] 462 478 492/496 ([500])} or ±{(4) 14 30 46 62 76/80 94 110 126 142 156/160 174 190 206 222 236/240 254 270 286 302 318 332/336 350 364 [366] 368 382 398 412/416 430 444 [446] 448 462 478 492/496 (498) ([500])}.

-Case 7: In a 16-blank unit from ±16

*Option 1: if adjustment according to a pilot position is not present, feedback tone indices may be ±{(4) 16 32 48 64 80 96 112 128 144 160 176 192 208 224 240 256 272 288 304 320 336 352 368 384 416 432 448 464 480 496 ([500])} or ±{(4) 16 32 48 64 80 96 112 128 144 160 176 192 208 224 240 256 272 288 304 320 336 352 368 384 416 432 448 464 480 496 (498) ([500])}.

*Option 2: if adjustment according to a pilot position is present, feedback tone indices may be ±{(4) 16 32 48 62/66 80 96 112 128 142/146 160 176 192 208 224 240 256 272 288 304 318/322 336 352 368 384 398/402 416 432 448 464 478/482 496 ([500])} or ±{(4) 16 32 48 62/66 80 96 112 128 142/146 160 176 192 208 224 240 256 272 288 304 318/322 336 352 368 384 398/402 416 432 448 464 478/482 496 (498) ([500])}.

-Case 8: In a 16-blank unit from ±18

*Option 1: if adjustment according to a pilot position is not present, feedback tone indices may be ±{(4) 18 34 50 66 82 98 114 130 146 162 178 194 210 242 [258] 274 290 306 322 338 354 370 386 402 418 434 450 466 482 498 ([500])} or ±{(4) 18 34 50 66 82 98 114 130 146 162 178 194 210 242 256 [258] 260 274 290 306 322 338 354 370 386 402 418 434 450 466 482 498 ([500])}.

*Option 2: if adjustment according to a pilot position is present, feedback tone indices may be ±{(4) 18 34 48/52 66 82 98 114 128/132 146 162 178 194 210 224/228 242 274 290 304/308 322 338 354 370 384/388 402 418 434 450 466 482 498 ([500])} or ±{(4) 18 34 48/52 66 82 98 114 128/132 146 162 178 194 210 224/228 242 256 [258] 260 274 290 304/308 322 338 354 370 384/388 402 418 434 450 466 482 498 ([500])}.

(3)-G) 1×HE-LTF, Ng=16

When the 1×HE-LTF is used and Ng=16, Case 1, Case 2, Case 3 and Case 4 may be divided and described.

-Case 1: In a 16-blank unit from ±4

*Option 1: if adjustment according to a pilot position is not present, feedback tone indices may be ±{4 20 36 52 68 84 100 116 132 148 164 180 196 212 228 244 260 276 292 308 324 340 356 372 388 404 420 436 452 484 [500]} or ±{4 20 36 52 68 84 100 116 132 148 164 180 196 212 228 244 260 276 292 308 324 340 356 372 388 404 420 436 452 484 496 [500]}.

*Option 2: if adjustment according to a pilot position is present, feedback tone indices may be ±{4 20 36 52 68 84 100 116 132 148 164 180 196 208/216 228 244 260 276 288/296 308 324 340 356 368/376 388 404 420 436 452 464/472 484 [500]} or ±{4 20 36 52 68 84 100 116 132 148 164 180 196 208/216 228 244 260 276 288/296 308 324 340 356 368/376 388 404 420 436 452 464/472 484 496 [500]}.

-Case 2: In a 16-blank unit from ±8

*Option 1: if adjustment according to a pilot position is not present, feedback tone indices may be ±{(4) 8 40 56 72 88 104 120 136 152 168 184 200 216 232 248 264 280 296 328 344 360 376 392 408 424 440 456 472 488 ([500])} or ±{(4) 8 40 56 72 88 104 120 136 152 168 184 200 216 232 248 264 280 296 308 [312] 316 328 344 360 376 392 408 424 440 456 472 488 (496) ([500])}.

*Option 2: if adjustment according to a pilot position is present, feedback tone indices may be ±{(4) 8 20/28 40 56 72 88 100/108 120 136 152 168 180/188 200 216 232 248 264 276/284 296 [312] 328 344 356/364 376 392 408 424 436/444 456 472 488 ([500])} or ±{(4) 8 20/28 40 56 72 88 100/108 120 136 152 168 180/188 200 216 232 248 264 276/284 296 308 [312] 316 328 344 356/364 376 392 408 424 436/444 456 472 488 (496) ([500])}.

-Case 3: In a 16-blank unit from ±12

*Option 1: if adjustment according to a pilot position is not present, feedback tone indices may be ±{(4) 12 28 44 60 76 108 [124] 140 156 172 188 [204] 220 236 252 268 284 300 316 332 348 364 380 396 412 428 444 460 476 492 ([500])} or ±{(4) 12 28 44 60 76 108 120 [124] 128 140 156 172 188 200 [204] 208 220 236 252 268 284 300 316 332 348 364 380 396 412 428 444 460 476 492 (496) ([500])}.

*Option 2: if adjustment according to a pilot position is present, feedback tone indices may be ±{(4) 12 28 44 60 76 88/96 108 [124] 140 156 168/176 188 [204] 220 236 248/256 268 284 300 316 332 348 364 380 396 412 428 444 460 476 492 ([500])} or ±{(4) 12 28 44 60 76 88/96 108 120 [124] 128 140 156 168/176 188 200 [204] 208 220 236 248/256 268 284 300 316 332 348 364 380 396 412 428 444 460 476 492 (496) ([500])}.

-Case 4: In a 16-blank unit from ±16
*Option 1: if adjustment according to a pilot position is not present, feedback tone indices may be ±{(4) 16 32 48 64 80 96 112 128 144 160 176 192 208 224 240 256 272 288 304 320 336 352 368 384 416 432 448 464 480 496 ([500])}.
*Option 2: if adjustment according to a pilot position is present, feedback tone indices may be ±{(4) 16 32 48 60/68 80 96 112 128 140/148 160 176 192 208 224 240 256 272 288 304 316/324 336 352 368 384 396/404 416 432 448 464 476/484 496 ([500])}.

A method for feeding channel status information back based on a feedback subcarrier determined using the aforementioned method and applying a Q is described below. A beamformee may perform channel estimation in all of subcarriers (in this case, a pilot subcarrier and a null subcarrier are excluded) of each group, may calculate an average channel value of the group, and may feed channel information in a feedback subcarrier back. Furthermore, the beamformee may feed only the channel information, estimated in the feedback subcarrier, back in the feedback subcarrier. A beamformer that has received the channel information forms a Q matrix for the fed-back subcarrier, identically applies the Q matrix formed in the fed-back subcarrier to all of subcarriers within each group, and transmits data (or a downlink frame).

Alternatively, the beamformee feeds only the channel information estimated in the feedback subcarrier back in the feedback subcarrier. The beamformer forms the Q matrix for only the fed-back subcarriers using the feedback information. Thereafter, the beamformer forms a Q matrix to be applied to other subcarriers by interpolating the Q matrix based on the fed-back subcarrier. The reason for this is that channel estimation for a subcarrier on which a value has not been carried in a 2×HE-LTF is obtained through interpolation and thus the Q matrix is also formed through interpolating in order to improve performance.

The fed-back information includes an average SNR (avg SNR), a V matrix, and a delta SNR. The average SNR may correspond to an average SNR of a single time-space stream regardless of an Ng value. The V matrix is transmitted in each feedback tone and is used for a beamformer to form a Q matrix. The delta SNR is transmitted by a difference (or delta) between an SNR in each feedback tone and an average SNR of all of time-space streams.

Figure 16:
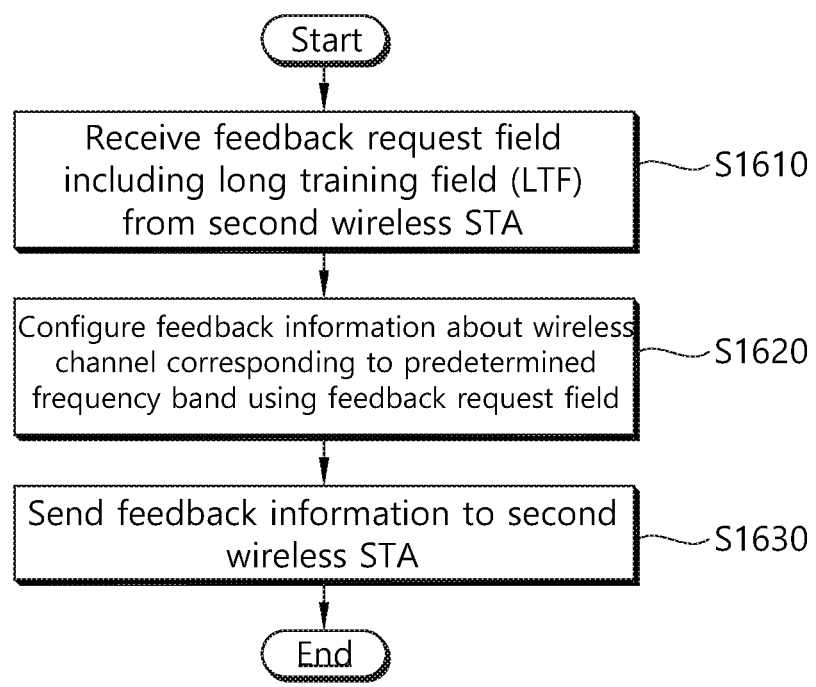
FIG. 16 is a flowchart illustrating a procedure for transmitting a feedback frame based on a sounding procedure according to an embodiment.

FIG. 16 is a flowchart illustrating a procedure for transmitting a feedback frame based on a sounding procedure according to the present embodiment.

Furthermore, FIG. 16 illustrates a method performed by a first wireless STA in a WLAN system supporting a plurality of frequency resource units corresponding to different frequency bands.

First, terms are defined below. The first wireless STA may correspond to a beamformee or an STA, and a second wireless STA may correspond to a beamformer or an AP. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU.

At step S1610, the first wireless STA receives a feedback request field, including a long training field (LTF), from the second wireless STA. The feedback request field including the LTF may correspond to a null data packet (NDP).

At step S1620, the first wireless STA configures feedback information about a wireless channel corresponding to a predetermined frequency band using the feedback request field.

At step S1630, the first wireless STA transmits the feedback information to the second wireless STA.

The feedback information includes channel status information about a predetermined subcarrier index. The predetermined subcarrier index may correspond to a feedback subcarrier index. Furthermore, the predetermined subcarrier index is determined depending on the predetermined number of subcarrier groupings. That is, the channel status information is indicative of a feedback subcarrier for each subcarrier group. In other words, the channel status information indicates where the feedback subcarrier is located within a frequency band.

The subcarrier group is generated based on grouping information in a subcarrier other than a guard subcarrier and a DC subcarrier within a frequency band. That is, the predetermined subcarrier index may be determined depending on the predetermined number of subcarrier groupings other than a guard subcarrier and a DC subcarrier.

As a detailed example, if the predetermined frequency band is 20 MHz and the predetermined subcarrier grouping number is set to 4, the predetermined subcarrier indices are set to [−122, −120:4:−4, −2, 2, 4:4:120, 122]. Here, the notation x:y:z corresponds to a range beginning at x and ending at z having a step size of y, i.e., the range indicated above corresponds to [(−122), −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, (−2), (2), 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, (122)]. The tone index (a) indicated by parentheses indicates that the index a is additionally used.

Furthermore, if the predetermined frequency band is 20 MHz and the predetermined subcarrier grouping number is set to 16, the predetermined subcarrier indices are set to [−122, −116:16:−4, −2, 2, 4:16:116, 122]. Here, the notation x:y:z corresponds to a range beginning at x and ending at z having a step size of y, i.e., the range indicated above corresponds to [(−122), −116, −100, −84, −68, −52, −36, −20, −4, (−2), (2), 4, 20, 36, 52, 68, 84, 100, 116, (122)]. The tone index (a) indicated by parentheses indicates that the index a is additionally used.

In this case, if the predetermined frequency band is 20 MHz and the predetermined subcarrier grouping number is set to 4 or 16, [−122, −2, 2, 122] of the predetermined subcarrier indices may be used to perform interpolation for channel estimation.

Furthermore, if the predetermined frequency band is 40 MHz and the predetermined subcarrier grouping number is set as Ng, the predetermined subcarrier indices are set to [−244:Ng:−4, 4:Ng:244]. Here, the notation x:y:z corresponds to a range beginning at x and ending at z having a step size of y, i.e., if the predetermined subcarrier grouping number is set to 4, the range indicated above corresponds to [−244, −240, −236, −232, −228, −224, −220, −216, −212, −208, −204, −200, −196, −192, −188, −184, −180, −176, −172, −168, −164, −160, −156, −152, −148, −144, −140, −136, −132, −128, −124, −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 192, 196, 200, 204, 208, 212, 216, 220, 224, 228, 232, 236, 240, 244]. If the predetermined subcarrier grouping number is set to 16, the range indicated above corresponds to [−244, −228, −196, −180, −164, −148, −132, −116, −100, −84, −68, −52, −36, −20, −4, 4, 20, 36, 52, 68, 84, 100, 116, 132, 148, 164, 180, 196, 228, 244].

Furthermore, if the predetermined frequency band is 80 MHz and the predetermined subcarrier grouping number is set as Ng, the predetermined subcarrier indices are set to [−500:Ng:−4, 4:Ng:500]. Here, the notation x:y:z corresponds to a range beginning at x and ending at z having a step size of y, i.e., if the predetermined subcarrier grouping number is set to 4, the range indicated above corresponds to [−500, −496, −492, −488, −484, −480, −476, −472, −468, −464, −460, −456, −452, −448, −444, −440, −436, −432, −428, −424, −420, −416, −412, −408, −404, −400, −396, −392, −388, −384, −380, −376, −372, −368, −364, −360, −356, −352, −348, −344, −340, −336, −332, −328, −324, −320, −316, −312, −308, −304, −300, −296, −292, −288, −284, −280, −276, −272, −268, −264, −260, −256, −252, −248, −244, −240, −236, −232, −228, −224, −220, −216, −212, −208, −204, −200, −196, −192, −188, −184, −180, −176, −172, −168, −164, −160, −156, −152, −148, −144, −140, −136, −132, −128, −124, −120, −116, −112, −108, −104, −100, −96, −92, −88, −84, −80, −76, −72, −68, −64, −60, −56, −52, −48, −44, −40, −36, −32, −28, −24, −20, −16, −12, −8, −4, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 192, 196, 200, 204, 208, 212, 216, 220, 224, 228, 232, 236, 240, 244, 248, 252, 256, 260, 264, 268, 272, 276, 280, 284, 288, 292, 296, 300, 304, 308, 312, 316, 320, 324, 328, 332, 336, 340, 344, 348, 352, 356, 360, 364, 368, 372, 376, 380, 384, 388, 392, 396, 400, 404, 408, 412, 416, 420, 424, 428, 432, 436, 440, 444, 448, 452, 456, 460, 464, 468, 472, 476, 480, 484, 488, 492, 496, 500]. If the predetermined subcarrier grouping number is set to 16, the range indicated above corresponds to [−500, −484, −452, −436, −420, −404, −388, −372, −356, −340, −324, −308, −292, −276, −260, −244, −228, −212, −196, −180, −164, −148, −132, −116, −100, −84, −68, −52, −36, −20, −4, 4, 20, 36, 52, 68, 84, 100, 116, 132, 148, 164, 180, 196, 212, 228, 244, 260, 276, 292, 308, 324, 340, 356, 372, 388, 404, 420, 436, 452, 484, 500].

If the predetermined subcarrier index overlaps a pilot subcarrier index, the overlapped subcarrier index may be set again as a neighboring subcarrier index at which an LTF coefficient is located. That is, if a feedback subcarrier and a pilot subcarrier overlap, a feedback subcarrier may be set as another neighboring subcarrier index. In this case, the number of samples used to form a Q matrix may be increased in a transmission stage (or a beamformer).

If the predetermined subcarrier index overlaps a null subcarrier index, the overlapped subcarrier index may be set again as a neighboring subcarrier index at which an LTF coefficient is located. That is, if a feedback subcarrier and a null subcarrier (or a leftover tone) overlap, another neighbor subcarrier may be added and fed back. More specifically, in a resource unit (RU) having a small size, it is necessary to additionally feed a signal back in a neighboring subcarrier because the signal is not transferred in a null subcarrier.

Furthermore, the channel status information includes average channel information estimated in a subcarrier other than the null subcarrier and the pilot subcarrier within the subcarrier group or channel information estimated in the feedback subcarrier. That is, the former can help performance due to a smoothing effect obtained because an average channel information value is fed back in all of subcarriers (in this case, except a null subcarrier and a pilot subcarrier) within a subcarrier group. The latter has an advantage in that overhead attributable a computational load can be reduced because only channel information estimated in a feedback subcarrier is fed back and thus it is not necessary to obtain an average channel information value of all of subcarriers. The channel status information is transmitted through the feedback subcarrier.

Furthermore, the feedback request field further includes a legacy-long training field (L-LFT). The size of inverse fast Fourier transform (IFFT) applied to the LTF may be one times or twice the size of IFFT applied to the L-LTF. That is, the aforementioned method may use an NDP to which a 1×-LTF or 2×-LTF has been applied in order to perform a sounding procedure.

Figure 17:
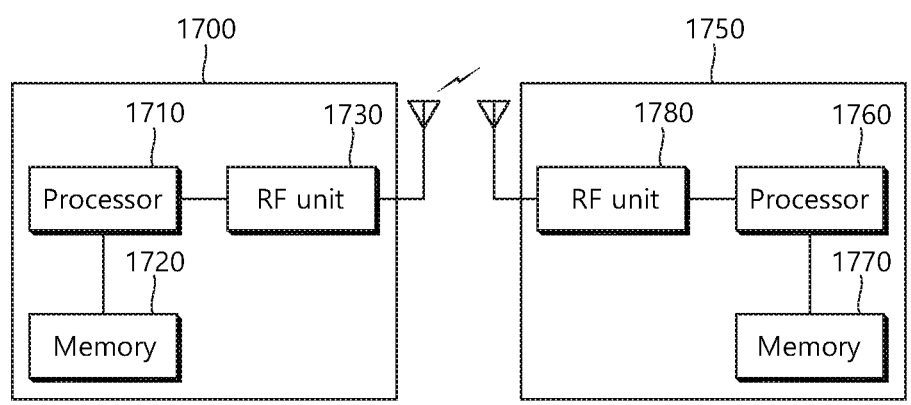
FIG. 17 is a block diagram of a wireless device according to an embodiment of the present invention.

FIG. 17 is a block diagram of a wireless device according to an embodiment of the present invention.

Referring to FIG. 17, as a station (STA) that can realize the above-described exemplary embodiment, the wireless device may correspond to an AP or a non-AP station (non-AP STA). The wireless device may correspond to the above 0described user or may correspond to a transmitting device transmitting a signal to the user.

The AP 1700 includes a processor 1710, a memory 1720, and a radio frequency unit (RF unit) 1730.

The RF unit 1730 is connected to the processor 1710, thereby being capable of transmitting and/or receiving radio signals.

The processor 1710 implements the functions, processes, and/or methods proposed in this specification. For example, the processor 1710 may be realized to perform the operations according to the above-described exemplary embodiments of the present invention. More specifically, the processor 1710 may perform the operations that can be performed by the AP, among the operations that are disclosed in the exemplary embodiments of FIG. 1 to FIG. 16.

The non-AP STA 1750 includes a processor 1760, a memory 1770, and a radio frequency unit (RF unit) 1780.

The RF unit 1780 is connected to the processor 1760, thereby being capable of transmitting and/or receiving radio signals.

The processor 1760 may implement the functions, processes, and/or methods proposed in the exemplary embodiment of the present invention. For example, the processor 1760 may be realized to perform the non-AP STA operations according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

What is claimed is:

1. A method for transmitting, by a first wireless station, feedback information in a wireless local area network (WLAN) system supporting a plurality of frequency resource units, the method comprising the steps of:
receiving a feedback request field comprising a long training field (LTF) from a second wireless station;
configuring the feedback information regarding a radio channel for a predetermined frequency band based on the feedback request field,
wherein the feedback information comprises channel status information about a predetermined subcarrier index,
wherein the predetermined subcarrier index is determined based on a predetermined subcarrier grouping number,
wherein, if the predetermined frequency band is 20 MHz and the predetermined subcarrier grouping number is set to 4, the predetermined subcarrier indices include [−122, −120, −112:4:−4, −2, 2, 4:4:112, 120, 122],
wherein, if the predetermined frequency band is 20 MHz and the predetermined subcarrier grouping number is set to 16, the predetermined subcarrier indices include [−122, −100:16:−4, −2, 2, 4:16:100, 122],
wherein, if the predetermined frequency band is 40 MHz and the predetermined subcarrier grouping number is set as Ng, the predetermined subcarrier indices include [−244:Ng:−4, 4:Ng:244],
wherein, if the predetermined frequency band is 80 MHz and the predetermined subcarrier grouping number is set as Ng, the predetermined subcarrier indices include [−500:Ng:−4, 4:Ng:500]; and
transmitting the feedback information to the second wireless station.

2. The method of claim 1, wherein, if the predetermined subcarrier index overlaps a pilot subcarrier index, the overlapped subcarrier index is set as a neighbor subcarrier index in which an LTF coefficient is located.

3. The method of claim 1, wherein, if the predetermined subcarrier index overlaps a null subcarrier index, the overlapped subcarrier index is set as a neighbor subcarrier index in which an LTF coefficient is located.

4. The method of claim 1, wherein, if the predetermined frequency band is 20 MHz and the predetermined subcarrier grouping number is set to 4 or 16, indices [−122, −2, 2, 122] of the predetermined subcarrier indices are used to perform interpolation for channel estimation.

5. The method of claim 1, wherein:
the feedback request field further comprises a legacy-long training field, L-LTF, and
a size of inverse fast Fourier transform, IFFT, applied to the LTF is one times or two times a size of IFFT applied to the L-LTF.

6. A first wireless station for transmitting feedback information in a wireless local area network (WLAN) system supporting a plurality of frequency resource units, the first wireless station comprising:
a radio frequency (RF) unit transmitting and receiving radio signals; and
a processor operatively coupled to the RF unit, wherein the processor is configured to:
receive a feedback request field comprising a long training field (LTF) from a second wireless station,
configure the feedback information regarding a radio channel for a predetermined frequency band based on the feedback request field,
wherein the feedback information comprises channel status information about a predetermined subcarrier index,
wherein the predetermined subcarrier index is determined based on a predetermined subcarrier grouping number,
wherein, if the predetermined frequency band is 20 MHz and the predetermined subcarrier grouping number is set to 4, the predetermined subcarrier indices include [−122, −120, −112:4:−4, −2, 2, 4:4:112, 120, 122],
wherein, if the predetermined frequency band is 20 MHz and the predetermined subcarrier grouping number is set to 16, the predetermined subcarrier indices include [−122, −100:16:−4, −2, 2, 4:16:100, 122],
wherein, if the predetermined frequency band is 40 MHz and the predetermined subcarrier grouping number is set as Ng, the predetermined subcarrier indices include [−244:Ng:−4, 4:Ng:244],
wherein, if the predetermined frequency band is 80 MHz and the predetermined subcarrier grouping number is set as Ng, the predetermined subcarrier indices include [−500:Ng:−4, 4:Ng:500], and
transmit the feedback information to the second wireless station.

7. The first wireless station of claim 6, wherein if the predetermined subcarrier index overlaps a pilot subcarrier index, the overlapped subcarrier index is set as a neighbor subcarrier index in which an LTF coefficient is located.

8. The first wireless station of claim 6, wherein if the predetermined subcarrier index overlaps a null subcarrier index, the overlapped subcarrier index is set as a neighbor subcarrier index in which an LTF coefficient is located.

9. The first wireless station of claim 6, wherein if the predetermined frequency band is 20 MHz and the predetermined subcarrier grouping number is set to 4 or 16, indices [−122, −2, 2, 122] of the predetermined subcarrier indices are used to perform interpolation for channel estimation.

10. The first wireless station of claim 6, wherein:
the feedback request field further comprises a legacy-long training field, L-LTF, and
a size of inverse fast Fourier transform, IFFT, applied to the LTF is one times or two times a size of IFFT applied to the L-LTF.

11. A method for receiving, by a first wireless station, feedback information in a wireless local area network (WLAN) system supporting a plurality of frequency resource units, the method comprising the steps of:
transmitting a feedback request field comprising a long training field (LTF) from a second wireless station;
receiving the feedback information regarding a radio channel for a predetermined frequency band based on the feedback request field,
wherein the feedback information comprises channel status information about a predetermined subcarrier index,
wherein the predetermined subcarrier index is determined based on a predetermined subcarrier grouping number,
wherein, if the predetermined frequency band is 20 MHz and the predetermined subcarrier grouping number is set to 4, the predetermined subcarrier indices include [−122, −120, −112:4:−4, −2, 2, 4:4:112, 120, 122],
wherein, if the predetermined frequency band is 20 MHz and the predetermined subcarrier grouping number is set to 16, the predetermined subcarrier indices include [−122, −100:16:−4, −2, 2, 4:16:100, 122],
wherein, if the predetermined frequency band is 40 MHz and the predetermined subcarrier grouping number is set as Ng, the predetermined subcarrier indices include [−244:Ng:−4, 4:Ng:244], and wherein, if the predetermined frequency band is 80 MHz and the predetermined subcarrier grouping number is set as Ng, the predetermined subcarrier indices include [−500:Ng:−4, 4:Ng:500].

* * * * *